US010901920B2

(12) United States Patent
Shah et al.

(10) Patent No.: US 10,901,920 B2
(45) Date of Patent: Jan. 26, 2021

(54) TURNSTILE API FOR RUNTIME PRIORITY BOOSTING

(71) Applicant: Apple Inc., Cupertino, CA (US)

(72) Inventors: Jainam A. Shah, San Jose, CA (US); Jeremy C. Andrus, Sunnyvale, CA (US); Daniel A. Chimene, San Francisco, CA (US); Kushal Dalmia, Santa Clara, CA (US); Pierre Habouzit, San Jose, CA (US); James M. Magee, Orlando, FL (US); Marina Sadini, Cupertino, CA (US); Daniel A. Steffen, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 105 days.

(21) Appl. No.: 16/380,300

(22) Filed: Apr. 10, 2019

(65) Prior Publication Data
US 2019/0370061 A1 Dec. 5, 2019

Related U.S. Application Data

(60) Provisional application No. 62/679,848, filed on Jun. 3, 2018.

(51) Int. Cl.
*G06F 9/46* (2006.01)
*G06F 12/14* (2006.01)
(Continued)

(52) U.S. Cl.
CPC ........ *G06F 12/1466* (2013.01); *G06F 9/4881* (2013.01); *G06F 9/5038* (2013.01);
(Continued)

(58) Field of Classification Search
CPC .......... G06F 9/526; G06F 9/52; G06F 9/5038; G06F 9/545; G06F 12/1466; G06F 12/0842; G06F 2209/5011; G06F 9/4881
See application file for complete search history.

(56) References Cited

U.S. PATENT DOCUMENTS 5,956,507 A * 9/1999 Shearer, Jr. ............... G06F 8/70
718/100
2007/0271450 A1 11/2007 Doshi et al.
(Continued)

OTHER PUBLICATIONS

Tommasco Cucinotta, Jul. 2013, "Priority Inheritance on Condition Variables", 10 pgs <Cucinotta_2013.pdf>.*
(Continued)

*Primary Examiner* — Tuan A Vu
(74) *Attorney, Agent, or Firm* — Jaffery Watson Mendonsa & Hamilton LLP

(57) ABSTRACT

One embodiment provides for a computer-implemented method comprising instantiating a synchronization primitive to control access to a resource, acquiring the synchronization primitive at a first thread, the first thread having a first priority, associating a turnstile with the synchronization primitive, setting an inheritor of the turnstile to the first thread, attempting to acquire the synchronization primitive at a second thread while the synchronization primitive is held by the first thread, the second thread having a second priority, adding the second thread to a wait queue of the turnstile; and in response to determining that the second priority is higher than the first priority, increasing the priority of the first thread to the second priority.

25 Claims, 20 Drawing Sheets

(51) Int. Cl.
*G06F 9/48* (2006.01)
*G06F 9/52* (2006.01)
*G06F 9/50* (2006.01)
*G06F 9/54* (2006.01)
*G06F 12/0842* (2016.01)

(52) U.S. Cl.
CPC ............... *G06F 9/52* (2013.01); *G06F 9/526* (2013.01); *G06F 9/541* (2013.01); *G06F 9/545* (2013.01); *G06F 12/0842* (2013.01); *G06F 2209/5011* (2013.01)

(56) References Cited

U.S. PATENT DOCUMENTS

2015/0286586 A1* 10/2015 Yadav ................. G06F 12/1466
                                                     711/152
2015/0347189 A1   12/2015 Steffen et al.

OTHER PUBLICATIONS

Jim Mauro, "Turnstiles and priority inheritance", SunWorld, Aug. 1999, 10 pgs <Mauro_turnstiles.pdf>.*
McKusick et al, "the Design and Inplementation of the FreeSystem", chapter 4 , Copyright 2015, pp. 89-146 <FreeBSD_Chp4.pdf>.*
Dr. Marshall Kirk McKusick, "An Overview of Locking in the FreeBSD Kernel", BSDCan Conference May 11, 2012, University of Ottawa, Ottawa, Canada, 20 pgs.
Jonathan Lemon, "Kqueue: A generic and scalable event notification facility", FreeBSD Project, created Apr. 30, 2001, 13 pgs.
FreeBSD Kernel Developer's Manual, FreeBSD Manual Pages, Locking, FreeBSD 11.1, Mar. 14, 2007, 5 pgs.
Jim Mauro, "Turnstiles and priority inheritance" http://www.sunworld.com/swol-08-1999/swol-08-innsidesolaris.html, 1999, 15 pgs.

* cited by examiner

TURNSTILE API FOR RUNTIME PRIORITY BOOSTING

CROSS-REFERENCE

This application claims priority to U.S. Provisional Patent Application No. 62/679,848 filed Jun. 3, 2018, which is hereby incorporated herein by reference.

TECHNICAL FIELD

This disclosure relates to electronic devices. More specifically, this disclosure relates to a system and associated methods for that provide a turnstile programming interface to enable runtime priority boosting.

BACKGROUND

Synchronization primitives allow threads to share common resources while serializing access to critical regions of code. For example, synchronization primitives allow threads to block in a wait queue till until the thread is allowed to access the critical region. Many synchronization primitives have a concept of an owner thread that is currently accessing the critical region. Non-owner threads wait until the owner thread completes access to the region. Under some circumstances, a priority inversion can occur in which a high priority thread is blocked waiting for a low priority thread that has access to a synchronization primitive. To overcome a priority inversion, some synchronization primitives implement some kind of priority boosting for the owner thread based on the priority of waiter thread. However, the specific priority boosting implementation for different synchronization primitives can differ. Where the different synchronization primitives lack a common implementation, priority boosting is not transitive across different types of synchronization primitives.

SUMMARY

Embodiments described herein provide a common framework that can be adopted across multiple different types of synchronization primitives to provide a common service for priority boosting and wait queuing. In one embodiment, a "turnstile" OS primitive is provided that enables support for owner tracking and waiting. A turnstile can enable one-hop priority boosting for the owner of the turnstile.

One embodiment provides for a data processing system comprising a memory device to store instructions and one or more processors coupled to the memory device. The one or more processors are to execute the instructions stored on the memory device. The instructions, when executed, cause the one or more processors to execute a first thread. The first thread has ownership of a first synchronization primitive and is in a wait state to acquire a second synchronization primitive. The first synchronization primitive is a user mode primitive, the second synchronization primitive is a kernel mode primitive, and the second synchronization primitive is owned by a second thread. The instructions additionally cause the one or more processors to boost the priority of the second thread while the first thread is in the wait state to acquire the second synchronization primitive in response to a determination that the first thread has a higher priority than the second thread. The first thread has a user mode priority and a kernel mode priority. To boost the priority of the second thread includes to apply the kernel mode priority to the second thread.

One embodiment provides for a non-transitory machine-readable medium storing instructions which, when executed, cause one or more processors to perform operations comprising executing a first thread at a first priority. The first thread has ownership of a first synchronization primitive of a first type and is in a wait state to acquire a second synchronization primitive of a second type that is different from the first type. The second synchronization primitive is owned by a second thread having a second priority. The operations additionally include executing a third thread at a third priority, where the third thread is to attempt to acquire the first synchronization primitive and the third priority is higher than the first priority and the second priority, and boosting the first thread to the third priority and propagate the boost to the second thread in response to determination that the first synchronization primitive is owned by first thread.

One embodiment provides for a computer-implemented method implemented via one or more processors, the method comprising executing a first thread at a first priority via the one or more processors, wherein the first thread has ownership of a first synchronization primitive of a first type and is in a wait state to acquire a second synchronization primitive of a second type that is different from the first type, the second synchronization primitive owned by a second thread having a second priority, executing a third thread at a third priority via the one or more processors, wherein the third thread is to attempt to acquire the first synchronization primitive and the third priority is higher than the first priority and the second priority, and boosting the first thread to the third priority and propagate the boost to the second thread in response to determination that the first synchronization primitive is owned by first thread.

Other features of the present embodiments will be apparent from the accompanying drawings and from the Detailed Description, which follows.

BRIEF DESCRIPTION OF THE DRAWINGS

Embodiments of the disclosure are illustrated by way of example, and not by way of limitation, in the figures of the accompanying drawings in which like reference numerals refer to similar elements, and in which.

DETAILED DESCRIPTION

Figure 1:
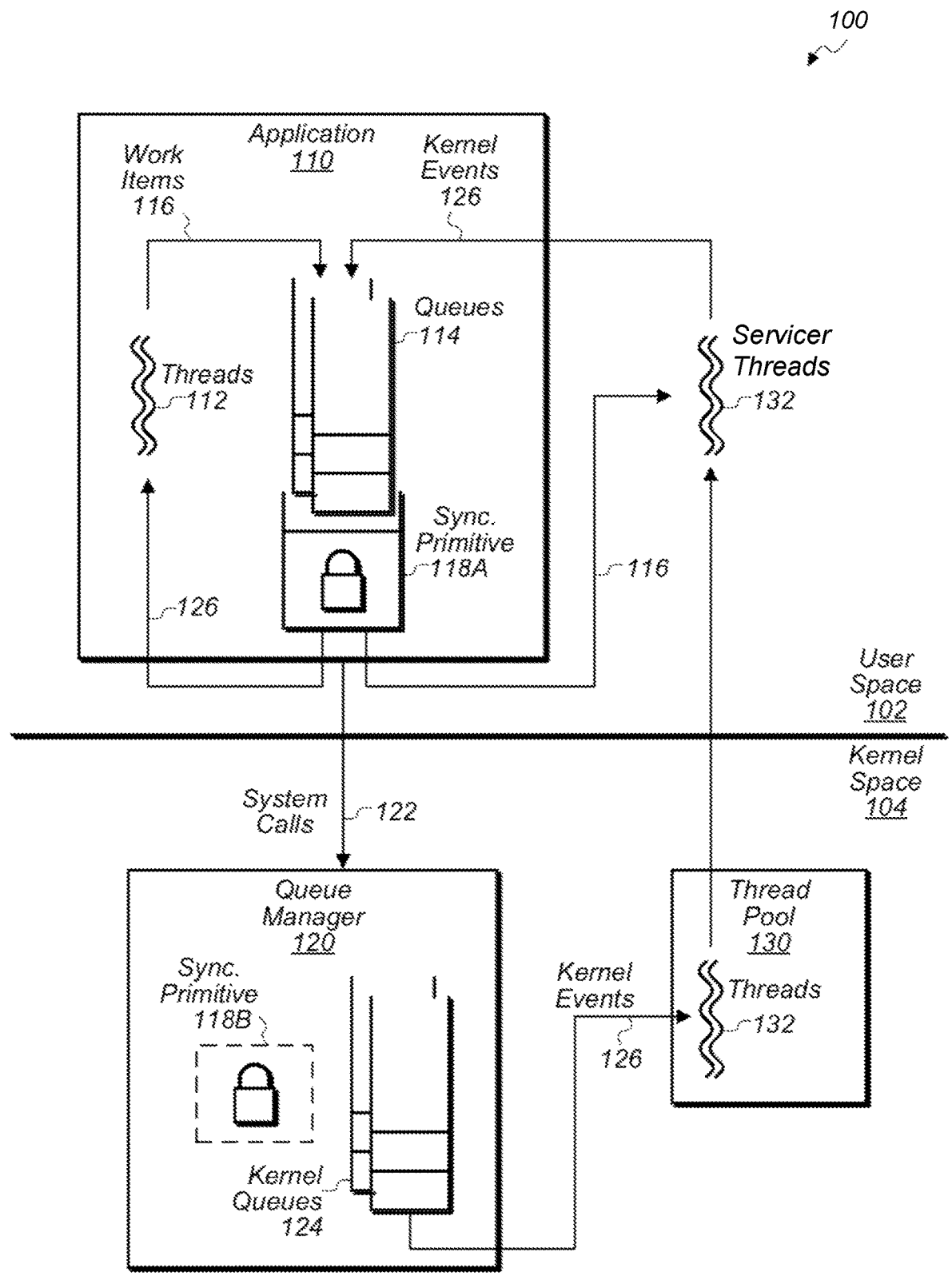
FIG. 1 is a block diagram of a computing system configured to execute multiple threads.

Embodiments described herein provide a common framework that can be adopted across multiple different types of synchronization primitives to provide a common service for priority boosting and wait queuing. In one embodiment, a "turnstile" OS primitive is provided that enables support for owner tracking and waiting. A turnstile can enable one-hop priority boosting for the owner of the turnstile. A turnstile can also provide a mechanism to enable a turnstile to block on another turnstile. Multi-hop priority boosting is also provided for owners within a chain of multiple blocking turnstiles. A turnstile can provide a boosting mechanism for non-QoS world threads. In one embodiment, turnstiles have finely tuned integration with wait queues and include support for priority sorted wait queues. In one embodiment, turnstiles are implemented without the use of higher OS primitives that would prevent the adoption of the turnstile by the kernel mutex primitive. Thus, turnstiles can be used in user-space and kernel-space synchronization primitives. In one embodiment, hashed lookup of turnstiles is also supported.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software (as instructions on a non-transitory machine-readable storage medium), or a combination of both hardware and software. Reference will be made in detail to various embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

To facilitate delivery of work items and kernel events within a data processing system, an application can instantiate a collection of queues to receive work items and kernel events for processing. Accordingly, if a thread of an application wants to have a work item processed, the thread can enqueue the work item in the collection of queues and have the kernel dispatch a thread from the thread pool, as opposed to spawning a child thread to handle the item. The dispatched thread can then dequeue the work item and process it. Similarly, a dispatched thread delivering a kernel event can enqueue the thread in the collection of queues and an application thread can subsequently dequeue the kernel event for processing. Such a delivery scheme may be advantageous over the prior delivery approach noted above as a dedicated kernel-event processing thread does not need to be maintained, freeing up additional resources.

As application threads and dispatched threads can simultaneously compete to enqueue and/or dequeue work items and kernel events, in various embodiments, a synchronization primitive is instantiated to control access to the collection of queues. As used herein, the term "synchronization primitive" is to be interpreted according to its understood meaning in the art, and includes a data structure that controls access to a resource in a manner that ensures mutual exclusion such as a semaphore, mutex, lock, etc. In various embodiments, the synchronization primitive is operable to, not only control access to a collection of queues, but also store various metadata about enqueue items, which is useful to the kernel as well as dispatched threads. For example, in some embodiments, the synchronization primitive can store an execution priority associated with an enqueued item to indicate that the kernel is supposed to dispatch a thread at that execution priority to perform the work item. In some embodiments, the kernel is unable to directly access the synchronization primitive; however, information stored in the synchronization primitive can be exposed via one or more system calls to the kernel, which can instantiate a data structure corresponding to the synchronization primitive for storing this conveyed information. For example, this data structure can include the priority of an enqueued item. In various embodiments, the kernel stores additional information in this structure that may be helpful for dispatching threads. For example, in some embodiments, this additional information can include an identifier for any dispatched thread, which is associated with the synchronization primitive (or more generally the collection of queues). If the kernel receives a system call from an application requesting a thread to handle a newly enqueued work item, the kernel can determine from this identifier that a thread has already been dispatched to operate on an earlier enqueued item in the collection of queues and can operate on this newly enqueued item (or can determine to delay dispatching another thread until the previously dispatched thread returns to the thread pool). As a result, the number of times a thread gets dispatched and/or the frequency of dispatching threads can be reduced.

FIG. 1 is a block diagram of a computing system 100 configured to execute multiple threads. In one embodiment the system 100 includes an application 110, queue manager 120, and thread pool 130. Application 110 includes one or more application threads 112, queues 114, and a synchronization primitive 118A. Queue manager 120 includes a synchronization primitive 118B and kernel queues 124. Thread pool 130 includes servicer threads 132, which in some implementations are also referred to as worker threads. In some embodiments, system 100 can be implemented differently than shown. For example, system 100 include multiple instances of application 110, with each application including multiple collections of queues 114. In one embodiment, the system 100 can also include multiple thread pools 130.

In one embodiment, application 110 resides in user space 102 while queue manager 120 and thread pool 130 reside in kernel space 104. As used herein, a "user space" (or application space) refers to a classification of applications (i.e., processes) that execute with restricted privileges (e.g., restricted access to files, addresses, hardware, etc.) and typically includes applications that are not responsible for management of the computer system. Examples of user-space applications include, for example, word processing applications, web browsers, mail clients, etc. For security reasons, most applications typically run as user-space applications. The term "user space" can also refer to a region (or regions) of memory allocated to a user-space application for storage of its program instructions and application data. In many instances, a user-space application 110 can be restricted to accessing only data within a user-space region of memory. In contrast, "kernel space" (or system space) refers to a classification of applications that execute with unrestricted privileges and typically includes applications responsible for system management. Examples of kernel-space applications can include an operating system kernel, drivers, a hypervisor, etc. "Kernel space" can also refer to restricted regions of memory that can only be accessed by kernel-space applications. In some embodiments, kernel-space applications may also be restricted from accessing user-space regions of memory. Restricting applications 110 in this manner can provide additional security as it can prevent a malicious (or malfunctioning) application from executing with the full set of privileges given to, for example, the operating system kernel. It can also prevent kernel-space applications from being compromised by causing them to run user-space program instructions.

Application 110, in various embodiments, is a multi-threaded application and can correspond to any suitable application such as those mentioned above. Being a multi-threaded application, application 110 may spawn multiple threads 112 to perform multiple actions concurrently. For example, if application 110 is a mail client, application 110 can have a main thread 112 for managing the user interface and spawn another thread 112 for retrieving email from a mail server concurrently. As an alternative to spawning an additional thread 112 to perform some action, in various embodiments, an application 110 can offload the work (shown as a work item 116) to a servicer thread 132 for performance. As used herein, the term "work item" refers generally to a set of instructions for performing some action. For example, a mail client can present multiple panels, each showing a respective portion of a received email in a user's inbox. Rather than spawn multiple threads 112 to read each email portion, the mail client can provide a work item 116 for each panel to cause one or more servicer threads 132 to perform reading the email portions from memory. Application 110 can also receive notifications (e.g., kernel events 126) from the kernel when particular events occur. For example, a mail application can receive and event that indicates that a push notification has been received from a mail server. A servicer thread 132 can be dispatched to deliver such a kernel event 126 in response to, for example, a network interface card receiving traffic via a particular TCP/IP port associated with the push notification. Kernel events 126 can also be used to deliver inter-process communications such as a request from another application to open a window for a user to compose an email because the user clicked an email address in the other application.

Queues 114 can be instantiated by an application 110 to facilitate the exchange of work items 116 and kernel events 126 between threads 112 and 132. Accordingly, if an application thread 112 is to offload a work item to a servicer thread 132, the thread 112 can enqueue the work item in a queue 114, and a servicer thread 132 can retrieve the work item 116 from the queue 114 to perform the work item 116. In some embodiments, work items 116 can be enqueued asynchronously or synchronously. In asynchronous enqueuing, a thread 112 delivers a work item 116 and continues to execute while the work item 116 is being performed. In synchronous enqueuing, a thread 112 delivers a work item 116 and blocks (i.e., suspends execution) while the work item 116 is being performed.

If the kernel intends to deliver a kernel event 126 via a servicer thread 132, the thread 132 can enqueue the event 126 in a queue 114 until the appropriate thread 112 can dequeue the event. In some embodiments, work items 116 and events 126 are assigned one of multiple execution priorities in order to ensure that a particular quality of service (QoS) is achieved when processing the item 116 or event 126. For example, a time-sensitive work item 116 associated with rendering a user interface can be assigned a higher execution priority than an execution priority of a kernel event 126 indicating that new email is available for retrieval. In such an embodiment, queues 114 can be priority queues that select items 116 and events 126 based on their assigned priorities—giving favoritism to higher priorities. In some embodiments, an application 110 can instantiate a single queue 114, a collection of queues 114, or (as discussed below with respect to FIG. 2) a collection of queues 114 arranged in a manner that collectively implement a queue. In some embodiments, queues 114 are operable such that only a single item 116 or event 126 can be enqueued or dequeued at a given time by a thread 112 or 132. In another embodiment, queues 114 can permit multiple items 116 and events 126 to be enqueued at a given time, but not multiple items 116 and events 126 to be dequeued at a given time.

Synchronization primitive 118A, in various embodiments, is a data structure operable to control access to queues 114 by threads 112 and 132. In some embodiments, this access control includes ensuring mutual exclusion for threads 112 and 132 dequeuing and potentially executing content of queues 114. Accordingly, if a servicer thread 132 wants to dequeue a work item 116, it can acquire primitive 118A in order to ensure that no other thread dequeues the work item 116 and also executes that item 116. As will be discussed below, if another thread 112 or 132 wants to acquire primitive 118A, but it is already held by another thread (i.e., primitive 118A is contented), the other thread can wait if it has a lower execution priority and cause the original holder to be overridden. As used herein, the term "override" refers to elevating the execution priority of the thread holding a primitive in order to expedite its serving of a queue and releasing of a primitive. In some embodiments, however, primitive 118A does not control access for enqueuing work items 116 or kernel events 126. In such an embodiment, queues 114 can be operable to support simultaneous enqueuing of work items and/or kernel events 126. For example, in one embodiment, queues 114 can implement an atomic FIFO queue. In other embodiments, primitive 118A can be acquired to enqueue items 116 and/or events 126. In some embodiments, primitive 118A can also be acquired to ensure mutual exclusion of queues 114 when no enqueuing or dequeuing is performed. In some embodiments, instantiation of queues 114 and/or primitive 118A can be performed by application 110 via an application programming interface (API) accessible to application 110.

As noted above, in various embodiments, synchronization primitive 118A also stores useful metadata pertaining to the work items 116 and kernel events 126 enqueued in queues 114—thus primitive 118A can be said to provide uses other than merely controlling access to queues 114. As will be discussed below and in greater detail with FIG. 3, this metadata can include priority information associated with enqueued items, information about an owner thread or threads waiting to acquire primitive 118A, etc. As noted above, in some embodiments, at least a portion of this useful metadata can be conveyed to the kernel via one or more system calls 122 as primitive 118A may not be directly accessible by processes in kernel space 104. These system calls 122 can be made by an application thread 112 when items 116 are enqueued (e.g., to request a servicer thread 132) or when events 126 are dequeued. Calls 122 can then be handled by queue manager 120.

Queue manager 120, in various embodiments, is a set of program instructions that are included in an operating system kernel and are executable to manage queues 114. While various operations are described herein as being performed by queue manager 120, these operations may also be described more generally as being performed by an operating system kernel. As part of this management, queue manager 120 can receive system calls 122 requesting performance of newly enqueued work items 116 and dispatch threads 132 from thread pool 130 to service those requests. Queue manager 120 can also receive systems calls 122 from an application 110 to register for the reception of particular kernel events 126. Queue manager 120 may then dispatch threads 132 from thread pool 130 to deliver those events 126 as events occur in system 100. In the illustrated embodiment, manager 120 maintains kernel queues 124 to store kernel events 126 for an application 110 until the events 126 can be delivered by dispatched servicer threads 132. For example, if an application 110 has registered to receive a kernel event 126 indicating when a particular file has become available for access, manager 120 may enqueue a kernel event 126 in a queue 124 in response to the kernel determining that the file has become available. Queue manager 120 may then instruct thread pool 130 to dispatch a servicer thread 132 to deliver the event 126. In some embodiments, kernel queues 124 and kernel events 126 correspond to BSD kqueues and kevents, respectively.

Thread pool 130, in various embodiments, is a collection of servicer threads 132 that can be dispatched from kernel space 104 to user space 102 to assist application 110 by performing enqueued work items 116 and delivering kernel events 126 from kernel queues 124. In some embodiments, thread pool 130 is shared among multiple applications 110—i.e., a thread 132 may assist one application 110 and later assist another 110. In other embodiments, thread pool 130 assist only one application 110 and may be one of multiples pools 130. Threads 132 may be described as "ephemeral threads" as they may move up to user space 102 temporarily before returning to kernel space 104 to prepare for subsequent dispatches. In some embodiments, a thread 132 may be dispatched for some initial purpose (e.g., delivery of an event 126 or performance of an item 116) but determine after being dispatched that queues 124 have additional events 126 received in the interim or that queues 114 have received additional work items 116. In response to making such a determination, a servicer thread 132 can remain in user space 102 to deliver these additional events 126 and/or process these additional work items 116. In various embodiments, threads 132 may be dispatched at higher or lower execution priorities depending on the execution priorities associated work items 116 or kernel events 126. In some embodiments, queue manager 120 may cause a thread 132 to be dispatched a first execution priority associated with an element 116 or 126 and then cause the execution priority to be changed to a second execution priority if the thread is going process some other element 116 or 126 associated with a different execution priority.

As noted above, in various embodiments, queue manager 120 may not be able to directly access primitive 118A but may receive information included in primitive 118A via system calls 122. To maintain this received information, queue manager 120 may instantiate a data structure (show as synchronization primitive 118B) corresponding to primitive 118A and may store the received information in this structure. In some embodiments, primitive 118B has a one-to-one correspondence to primitive 118A—accordingly, queue manager 120 may have multiple primitives 118B if an application 110 has multiple primitives 118A. In the illustrated embodiment, primitive 118B is shown with a dotted line to indicate that primitive 118B may be maintained temporarily. For example, in some embodiment, queue manager 120 may delete primitive 118B if there are no work items 116 currently enqueue in queues 114 and the application 110 has not requested that the kernel detect occurrences of any events.

Figure 2:
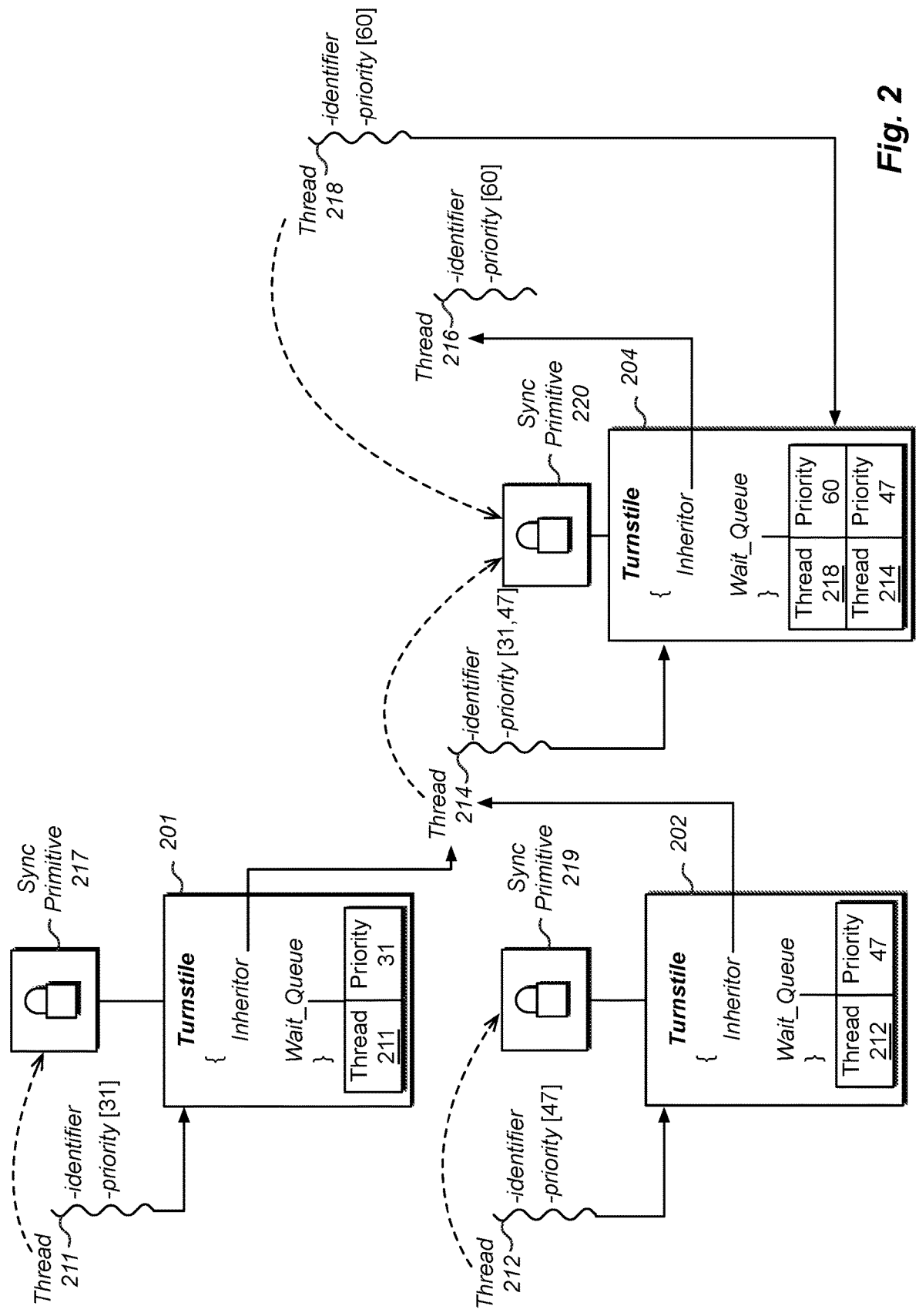
FIG. 2 illustrates operation of a turnstile API that can facilitate consistent handling of wait queues and thread boosting for synchronization primitives.

FIG. 2 illustrates operation of a turnstile API that can facilitate consistent handling of wait queues and thread boosting for synchronization primitives. In one embodiment, an operating environment of a computing system can execute multiple simultaneous threads, where access to critical regions of code is serialized by synchronization primitives such as locks, mutexes, and other types of synchronization objects. Each thread can include various management data, including a thread identifier and one or more priorities. Threads include pointers to turnstiles. When a thread acquires a synchronization primitive, the thread can donate the turnstile to the primitive if the primitive does not yet have a turnstile or can add the pointer to the turnstile to a free list. When the thread releases the synchronization primitive, the thread can acquire a pointer to a turnstile from the free list.

As shown in FIG. 2, thread 211 can attempt to acquire synchronization primitive 217. Thread 212 can attempt acquire synchronization primitive 219. Synchronization primitive 217 and synchronization primitive 219 are each already owned thread 214. Thread 211 is added to the wait queue of turnstile 201, which is associated with synchronization primitive 217, for example, via a pointer held by synchronization primitive 217. Thread 211 is added to the wait queue of turnstile 201 by adding an object to the wait queue that identifies thread 211 and the priority of thread 211. Thread 212 is added to the wait queue of turnstile 202, which is associated with synchronization primitive 219, by adding an object to the wait queue that identifies thread 212 and the priority of thread 212.

Turnstile 201 and turnstile 202 each identify thread 214 as an inheritor. The inheritor of a turnstile is the thread or turnstile that will receive a priority boost if necessary to avoid a priority inversion in which a higher priority thread is blocked by operations performed by a lower priority thread. Where a thread is an inheritor of a turnstile, the thread can receive a priority boost from the turnstile. Where a thread is the inheritor of multiple turnstiles, the thread can receive multiple priority boosts and can execute at the highest boosted priority. For example, the priority [31] of thread 211 is propagated to thread 214. The priority [47] of thread 212 is also propagated to thread 214. In one embodiment, thread 214 can maintain a priority queue that contains a list of priorities being pushed to the thread from multiple turnstiles. The priority queue of thread 214 can contain a list, which may be a rank ordered list, of each priority (e.g., [31, 47]) being pushed to the thread. Thread 214 would then execute at priority [47], which is the higher priority boost. If the push to priority [47] were to fall off, thread 214 would then execute at priority [31].

When thread 214 attempts to acquire synchronization primitive 220, thread 214 is added to the wait queue of turnstile 204, which is associated with synchronization primitive 220. Thread 218 can also attempt to acquire synchronization primitive 220 and will be added to the wait queue of turnstile 204. In one embodiment, thread 218, thread 214 and associated priorities are added in priority order, such that the highest priority waiting thread is the head of the queue. Sync primitive 220 is held by thread 216, which is set as the inheritor of turnstile 204. As the inheritor of turnstile 204, thread 216 is boosted to priority [60], which is the highest priority of the waiters in the wait queue of turnstile 204.

When a thread releases a synchronization primitive, the highest priority waiter in the turnstile of the synchronization primitive can next acquire the synchronization primitive. That highest priority waiter is then set as the inheritor of the turnstile. When a turnstile has no waiters, the inheritor is set to NULL.

Figure 3:
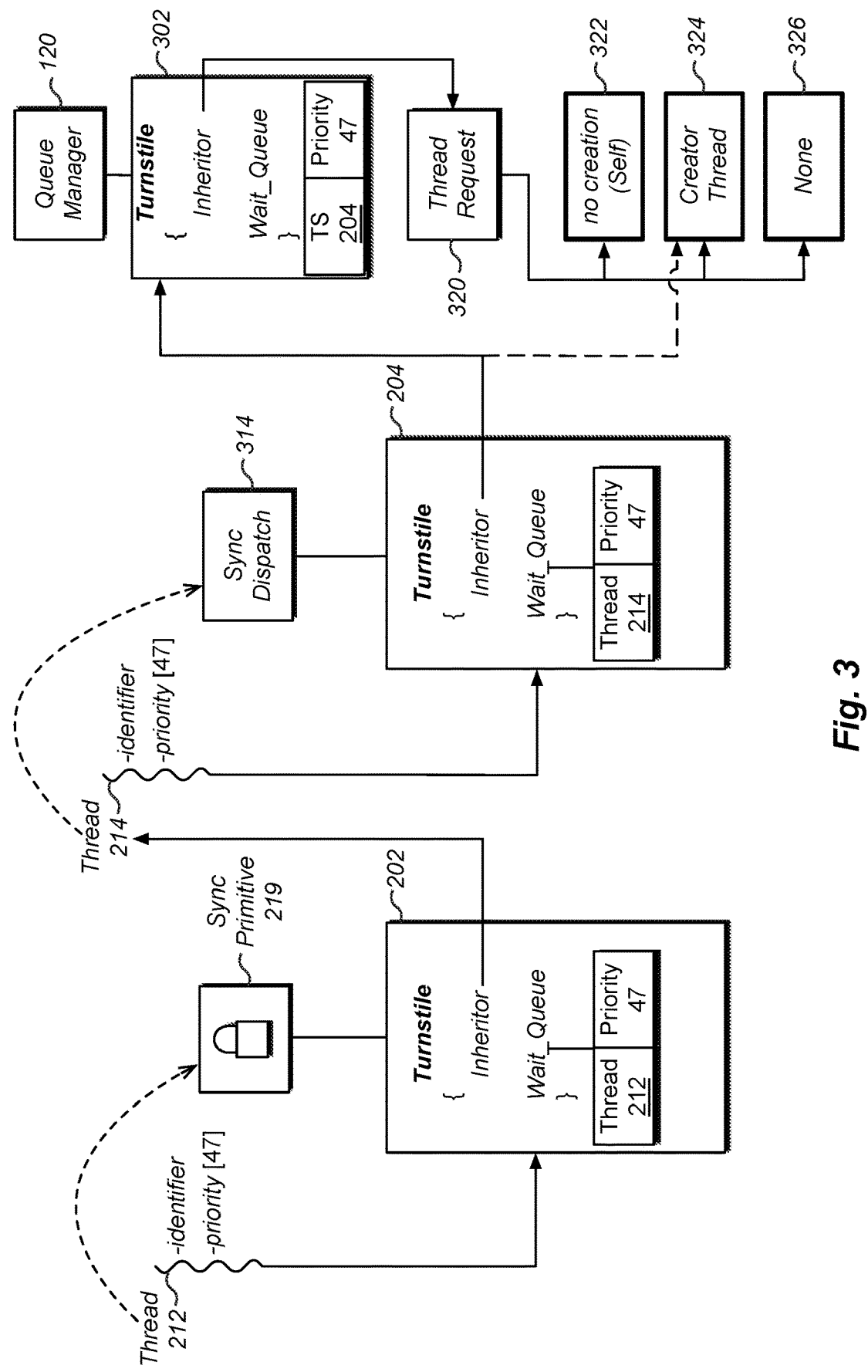
FIG. 3 illustrates use of the turnstile API with a queue manager, according to an embodiment.

FIG. 3 illustrates use of the turnstile API with a queue manager, according to an embodiment. In one embodiment, synchronization primitive 219 can be held by thread 214, while thread 212 waits to access synchronization primitive 219. Thread 214 can be blocked waiting on completion of a synchronous dispatch 314, which can be associated with turnstile 204. The synchronous dispatch 314 enables thread 214 to synchronously dispatch a block of code for execution. Thread 214 can be associated with a run loop which will wake the thread and allow the thread to execute the block of code. In one embodiment, sync dispatch 314 can be blocked waiting on an asynchronous dispatch managed by the queue manager 120.

To expedite the completion of operations associated with thread 214, which may be a lower priority thread than thread 212, the priority of thread 212 can be propagated to thread 214. In turn, the boosted priority of thread 214 can be propagated through turnstile 204 to turnstile 302, which is associated with the queue manager 120. The synchronous dispatch 314 may be blocked until completion of an asynchronous dispatch operation currently managed by the queue manager 120. Completion of the asynchronous dispatch by the queue manager 120 is dependent upon completion of a thread request 320 to provide a creator thread 324. To boost the priority of the queue manager 120, turnstile 302 is set as the inheritor of turnstile 204. An object that identifies turnstile 204 can be added to the wait queue of turnstile 302. The inheritor that is set for turnstile 302 can be determined based on a state of thread request 320.

A thread request is a request to run a block of code or deliver a thread event. As illustrated, thread request 320 is attempting to create a thread to execute a code block provided by synchronous dispatch 314. A thread can be pulled from a thread queue to run code or deliver an event associated with thread request 320. The thread request 320 can be priority boosted by turnstile 302 while in a no creation state 322 (e.g., waiting on a thread from a thread pool), in which thread request 320 points to itself, as there is not yet a thread to be boosted by turnstile 204. Once the thread request 320 transitions from a no creation state 322 or a no action state (none 326), the inheritor for turnstile 204 can be transitioned to the creator thread 324, allowing any necessary priority boost to be propagated to boost the priority of the creator thread 324, which will provide the thread used by the asynchronous dispatch managed by the queue manager 120, which is blocking the synchronous execution of the code block of thread 214. In one embodiment, when the thread request 320 is in the no action state, the inheritor of turnstile 302 may store a placeholder pointer to the queue manager 120 instead of setting the inheritor to a NULL state. During a subsequent priority propagation, when a queue manager turnstile is encountered that has a stashed queue manager pointer, the kernel can re-run the thread request state machine for queue manager 120 to determine if a new thread is to be created in response to the change in priority received via the priority push chain. Once the blocking asynchronous dispatch is handled by the queue manager 120, the synchronous dispatch 314 of thread 214 can be allowed to execute by the queue manager 120, unblocking thread 214. Thread 214 can then release synchronization primitive 219, which can then be acquired by the highest priority thread in the wait queue of turnstile 202 (e.g., thread 212).

The turnstile API can also be used with ports that can send messages within a system. One embodiment provides an operating system that makes use of Mach ports, although similar concepts can apply to other queue-based communication channels. In the case of Mach ports, the ports are used to allow messages to be sent between tasks. Tasks send messages to ports and are received in the order in which they were sent. Messages can contain a fixed-size header and a variable amount of typed data following the header, where the header describes the destination and size of the message. Messages can also contain rights to access a port. Each port can be associated with one receive right and one or more send rights and send-once rights, creating a unidirectional communication channel with allowing one receiver and one or more senders. A receive right names a queue associated with a port and authorizes the holder to dequeue messages from the queue (e.g., read from the port). The receive right also allows the holder to create send and send-once rights. Send and send-once rights designate a queue and authorize the holder of the right to enqueue messages (e.g., send to the port). Receive rights to a port can be sent in a message that is transmitted via another port.

In one embodiment, a port can have two blocking operations, a block on a send or a block on a receive. A port blocks on send when designated queue for the port is full. A port blocks on receive when the designated queue for the port is empty. For example, a thread attempting to send via a port becomes blocked when the queue associated with the port becomes full and no more data can be added. Once an item in the queue of the port has been removed, an additional item can be sent from the port. A thread attempting to read from a port is blocked when the queue is empty and there is no data to be read. A thread can read from the port once an item is received by the port (e.g., placed in the queue of the port). In one embodiment, a port can have multiple turnstiles, with at least one receive turnstile and at least one send turnstile. A thread can block on the turnstile associated with the type of operation that the thread is to perform on the port.

In one embodiment, a turnstile data structure is explicitly allocated for a port when needed. A turnstile can be allocated when a receive right is enqueued for a port, as the receive right can be associated with a synchronous inter-process communication (IPC) boost. A turnstile can also be explicitly allocated when a send-once right is enqueued to a special reply port, where a special reply port is a port that has been specially marked for receipt of a reply to a message. In one embodiment, a special reply port is reserved for synchronous IPC receives. In general, turnstiles associated with ports are used to propagate priority boosts to other threads that are performing operations related to those ports.

Figure 4A:
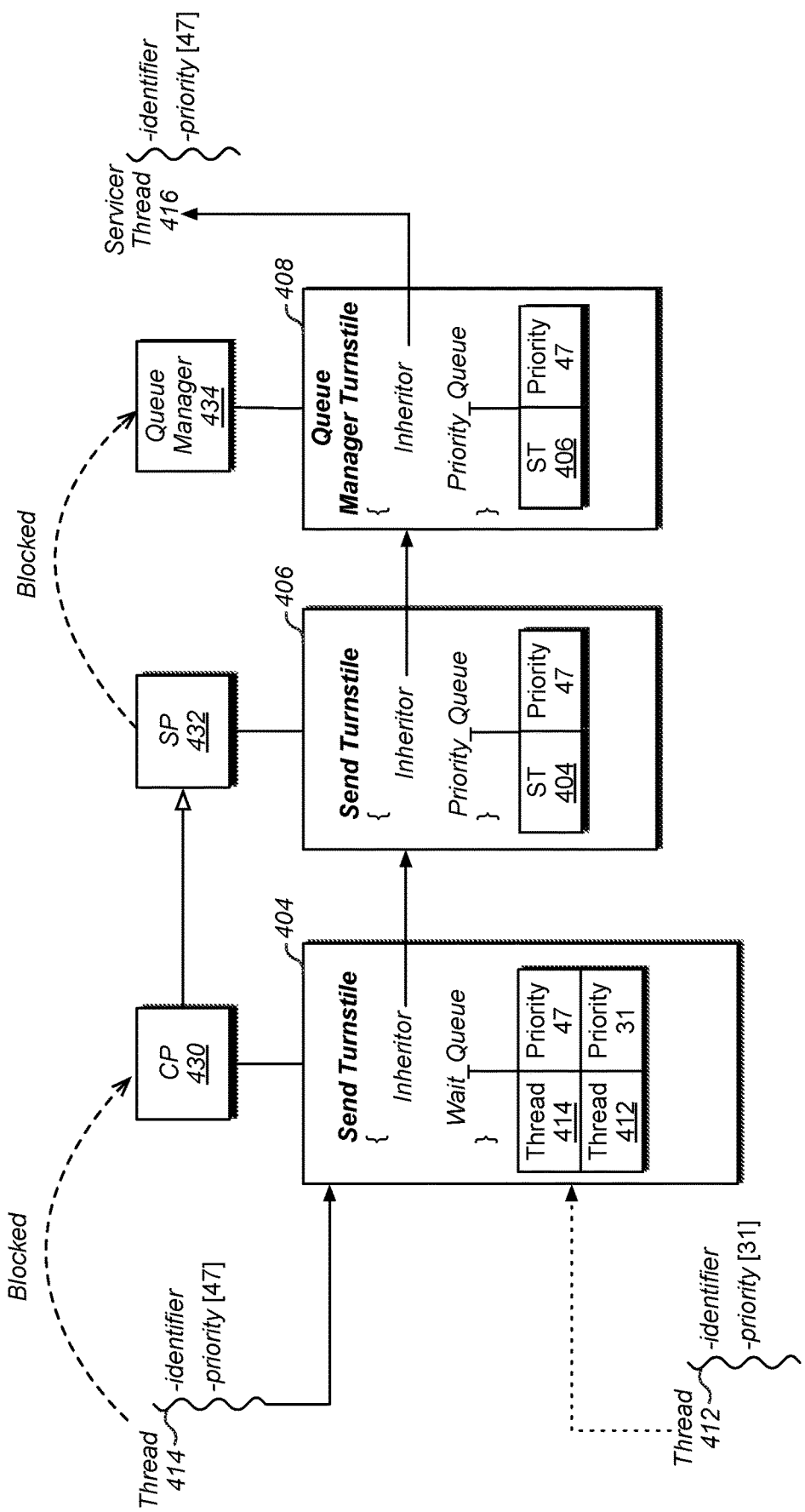
FIG. 4A-4D illustrate turnstile operations with ports, according to embodiments.
Figure 4B:
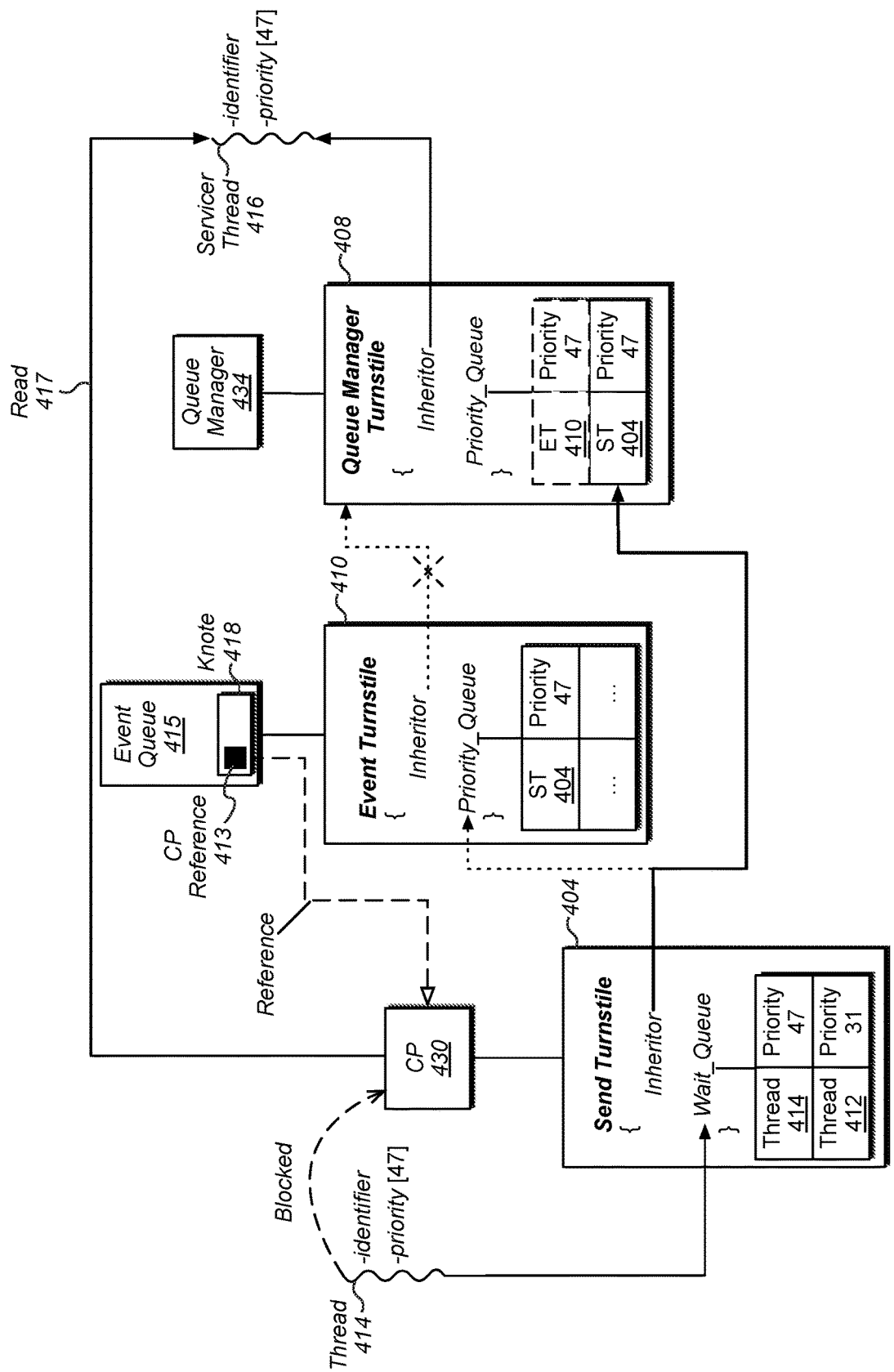
Figure 4C:
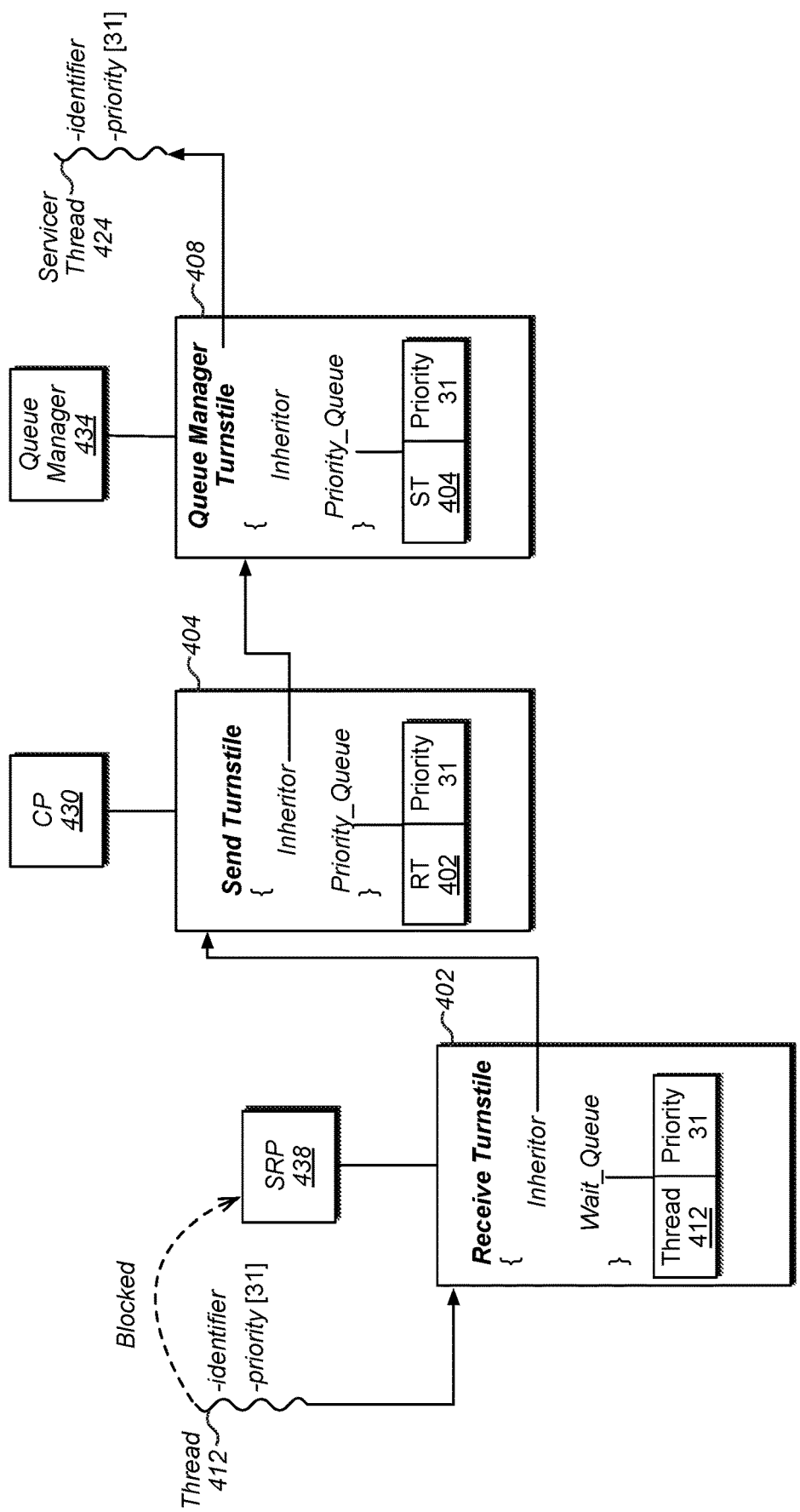
Figure 4D:
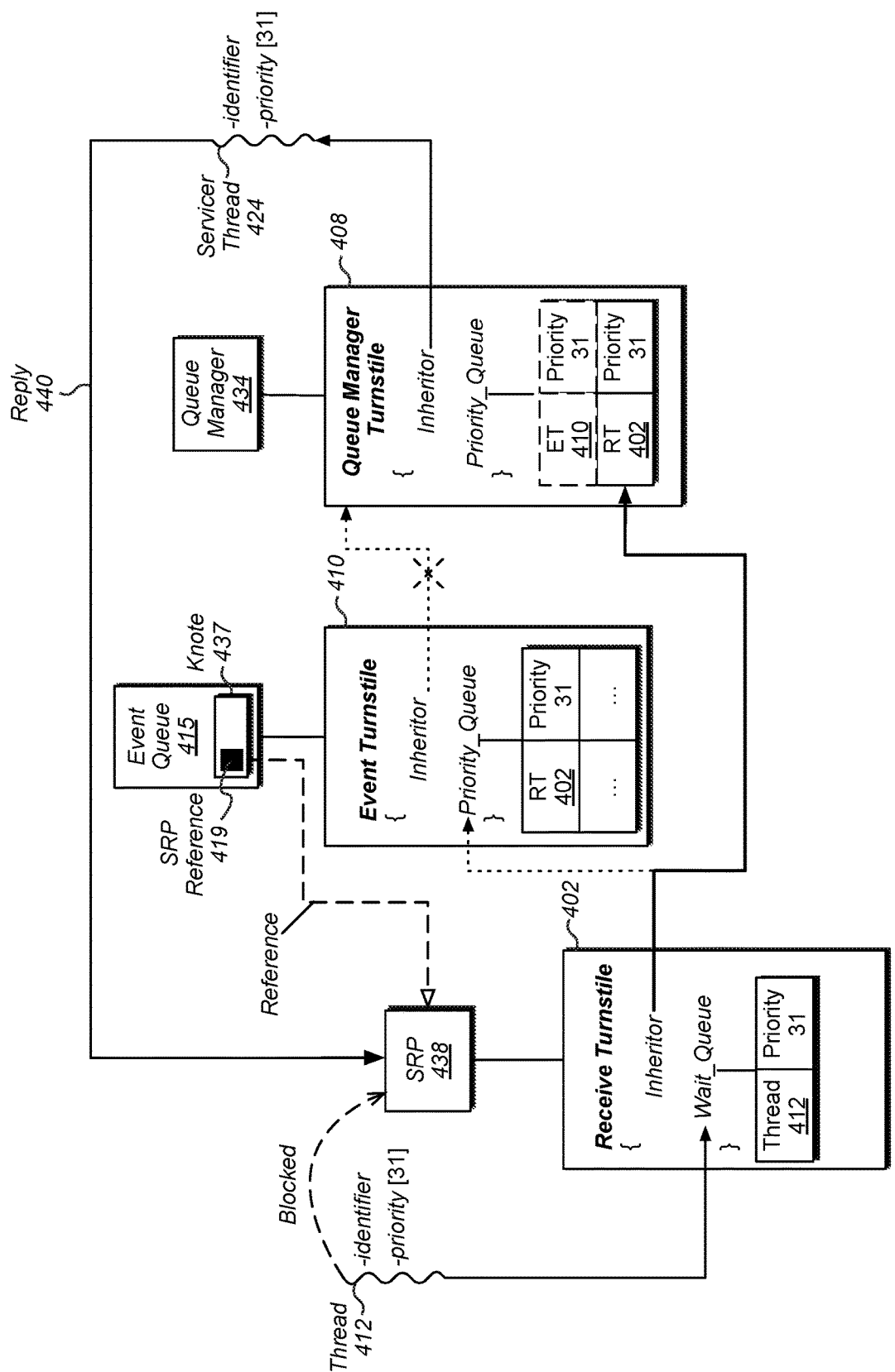

FIG. 4A-4D illustrate turnstile operations with ports, according to embodiments. FIG. 4A illustrates turnstile usage with connection ports and service ports. FIG. 4B illustrates a turnstile push transition in response to a kernel event. FIG. 4C illustrates turnstile usage with a special reply port. FIG. 4D illustrates an additional turnstile push transition in response to a kernel event. The ports of FIG. 4A-4D interact with a queue manager, which manages servicer threads that handle access rights to the ports. The queue manager and kernel events can operate in a similar manner as described with respect to the queue manager 120, kernel events 126, and servicer threads 132 of FIG. 1.

As shown in FIG. 4A, thread 412 having priority [31] and thread 414 having priority [47] are blocked on sending to connection port 430. The threads blocked by the connection port 430 can be added to a send turnstile 404 associated with the connection port. Blocked threads can be handled in priority order, with the highest priority of the blocked threads being propagated through the messaging infrastructure. The waiting threads can then become unblocked in priority order. In one embodiment, send turnstile 404 includes a wait queue that stores pointers or indicators to threads that are blocked by connection port 430. As illustrated, the wait queue of send turnstile 404 includes indicators for thread 414 and thread 412. Send turnstile 404 pushes the highest priority of the waiting threads to send turnstile 406, which is associated with service port 432.

In one embodiment, when a message is to be sent via the connection port 430, a receive right can be enqueued within a service port 432. The receive right identifies the connection port 430 from which data is to be received and grants the recipient of the message the right to read from the connection port 430. The receive right can be part of a message that will be sent to another port. Send turnstile 406 can be allocated when the receive right is enqueued into the service port 432. In one embodiment, send turnstile 406 is allocated when a receive right is enqueued into the service port 432 to enable the propagation of a priority boost that can be associated with the receive right. For example, a receive right associated with a synchronous IPC message may contain a priority boost, with the boosted priority stored in a priority queue of send turnstile 406.

An indicator for send turnstile 404 and an associated priority (e.g., priority [47]) are added to a priority queue of send turnstile 406. Send turnstile 406 then pushes the priority of the highest priority entry in its priority queue to queue manager turnstile 408, which is associated with a queue manager 434. The queue manager turnstile 408 includes a priority queue on which a pointer or indicator for send turnstile 406 is added. The queue manager 434 has an associated servicer thread 416 that performs work operations. The priority of the servicer thread 416 can be boosted to the highest priority in the boost chain (e.g., priority [47] of thread 414). The priority queues of the send turnstile 406 and the queue manager turnstile 408 are similar to the wait queues used to store indicators for threads, except the priority queues are used to track priority pushes, rather than track waiting threads.

Send turnstile 404 can be donated to connection port 430 when a thread (e.g., one of thread 412 or thread 414) blocks on connection port 430 and connection port 430 has not yet been associated with a turnstile. For example, if thread 412 is the first to block on connection port 430, a turnstile associated by thread 412 can become send turnstile 404. An indicator for thread 412 is then added to a wait queue of send turnstile 404. If thread 414 becomes blocked on connection port 430, an indicator to thread 414 and an associated priority is added in priority order to the wait queue of send turnstile 404. The highest priority in the wait queue of send turnstile 404 is pushed to send turnstile 406. The highest priority in the priority queue of send turnstile 406 is then pushed to the queue manager turnstile 408. The highest priority in the priority queue of the queue manager turnstile 408 is then pushed to the servicer thread 416, which, dequeues the receive right for connection port 430 from service port 432. Servicer thread 416, using the receive right to connection port 430, can retrieve a message from a queue associated with connection port 430, freeing connection port 430 to send an additional message. With the connection port 430 able to send a message, thread 414, which is the highest priority waiting thread for connection port 430, can enqueue a message to be sent via connection port 430. Additionally, once the receive right for connection port 430 is dequeued from the service port 432, the inheritor of send turnstile 404 can be changed from send turnstile 406 to queue manager turnstile 408, to maintain the priority push until the message for thread 414 is sent via connection port 430.

As shown in FIG. 4B, an event turnstile 410 can be associated with an event queue 415. The event queue 415 is associated with kernel queues 124 and kernel events 126 as described in FIG. 1 and is used as a notification channel by which events are delivered. The event queue 415 can be a kernel event queue (e.g., kqueue) that contains a set of kernel events that are ready to be delivered. A message will be received from a port when a servicer thread dequeues the message from the queue associated with the port. For example, servicer thread 416 can dequeue a message from the queue associated with connection port 430. The dequeue of the message from the queue of the connection port 430 can be performed in response to the firing of an event, such as a kernel event. In one embodiment a Knote (e.g., kernel note) can be registered with the kernel event system to indicate an interest in a certain event. Knote 418 can be registered to indicate an interest in the presence of a message in the queue of connection port 430. Servicer thread 416 is responsible for dequeuing the message from the connection port 430 in response to the firing of the event that indicates that a message is ready to be dequeued. Once the event has been received and the event queue 415 is removed from the boost chain for thread 414, the inheritor of send turnstile 404 can be set to push directly on queue manager turnstile 408.

While thread 414 is blocked waiting to send via connection port 430, the inheritor of send turnstile 404 can be set to an event turnstile 410 associated with the event queue 415, which in one embodiment enables the event system to operate at the priority of the highest priority thread that is dependent upon the event system. The event turnstile 410 can also push this priority through to the queue manager turnstile 408. A priority queue of the event turnstile 410 can include a priority ordered list of turnstiles for ports that are waiting on events and can push the priority of the highest priority waiter onto the queue manager turnstile 408. The queue manager turnstile can then push the highest priority of the entries in an internal priority queue onto servicer thread 416. In response to the firing of an event that indicates that connection port 430 has data to send, the servicer thread, while operating at the priority propagated from thread 414, can perform read operation 417, which reads a message from the queue associated with connection port 430. Read operation 417 can be performed on behalf of the holder of the receive right sent via service port 432 in FIG. 4A. In one embodiment, an optimization is performed in which if only one port is registered for an event, instead of creating event turnstile 410, Knote 418 can include a reference (CP reference 413) to the port that is to supply the priority boost to the queue manager 434. When such optimization is in place, the inheritor of send turnstile 404 can be set directly to queue manager turnstile 408.

As shown in FIG. 4C, when thread 414 is no longer blocked, the priority boost to priority [47] falls away from the turnstile chain. Thread 412, previously shown as blocked on send in FIG. 4A, is now is shown as blocked waiting on a receive from special reply port 438. A block on receive can occur in which a thread is to receive at a port that has an empty queue. Before a message can be received at the special reply port 438, a send-once right to send to the special reply port 438 will be sent via connection port 430. The sending of the message containing the send-once right via connection port 430 is illustrated in FIG. 4A, with thread 412 shown as blocked on sending to connection port 430. Receive turnstile 402 is configured to push the priority of thread 412 to send turnstile 404 associated with connection port 430. Send turnstile 404 then pushes the priority to queue manager turnstile 408 of queue manager 434. The priority boost is then applied to servicer thread 424, which performs operations that will lead to the unblocking of thread 412. As illustrated, the servicer thread 424 will dequeue a send once right from connection port 430 that allows a reply to be sent to special reply port 438, upon which thread 412 is blocked waiting on a receive.

As shown in FIG. 4D, event turnstile 410 and event queue 415 can operate with the receive turnstile 402 of the special reply port 438. As also shown in FIG. 4B, the event turnstile 410 can store references to turnstiles for ports that are blocked waiting on an event. Servicer thread 424 can dequeue the message containing the send once right for special reply port 438, as shown in FIG. 4C. The dequeuing of the send one right allows a reply to be sent to the receive turnstile, which will unblock thread 412. The servicer thread 424 is responsible for dequeuing the send once right, which can be performed in response to the firing of a kernel event (Kevent) that indicates that a right is ready to be dequeued. A Knote 437 associated with the firing of the kernel event can be placed in event queue 415. In one embodiment, Knote 437 directly includes a special reply port reference (SRP reference 419) that allows the receive turnstile 402 of the special reply port 438 to be configured to push on the queue manager turnstile 408. Storing the special reply port reference in Knote 437 is performed when only one turnstile for one port will be configured to push on the queue manager turnstile 408. If multiple turnstiles are to be configured for multiple ports, the event turnstile 410 can be allocated or acquired and its inheritor is set to the queue manager turnstile 408. Receive turnstile 402 will then push on event turnstile 410 until the send-once right is dequeued from the connection port 430 by the servicer thread 424, as shown in FIG. 4C. At that point, the inheritor of the event turnstile 410 can be set to NULL and the inheritor of the receive turnstile 402 can be set to queue manager turnstile 408 to push the priority of thread 412 to the service thread 424 until the reply 440 is sent, unblocking thread 412, which will then read from the special reply port 438.

Figure 5:
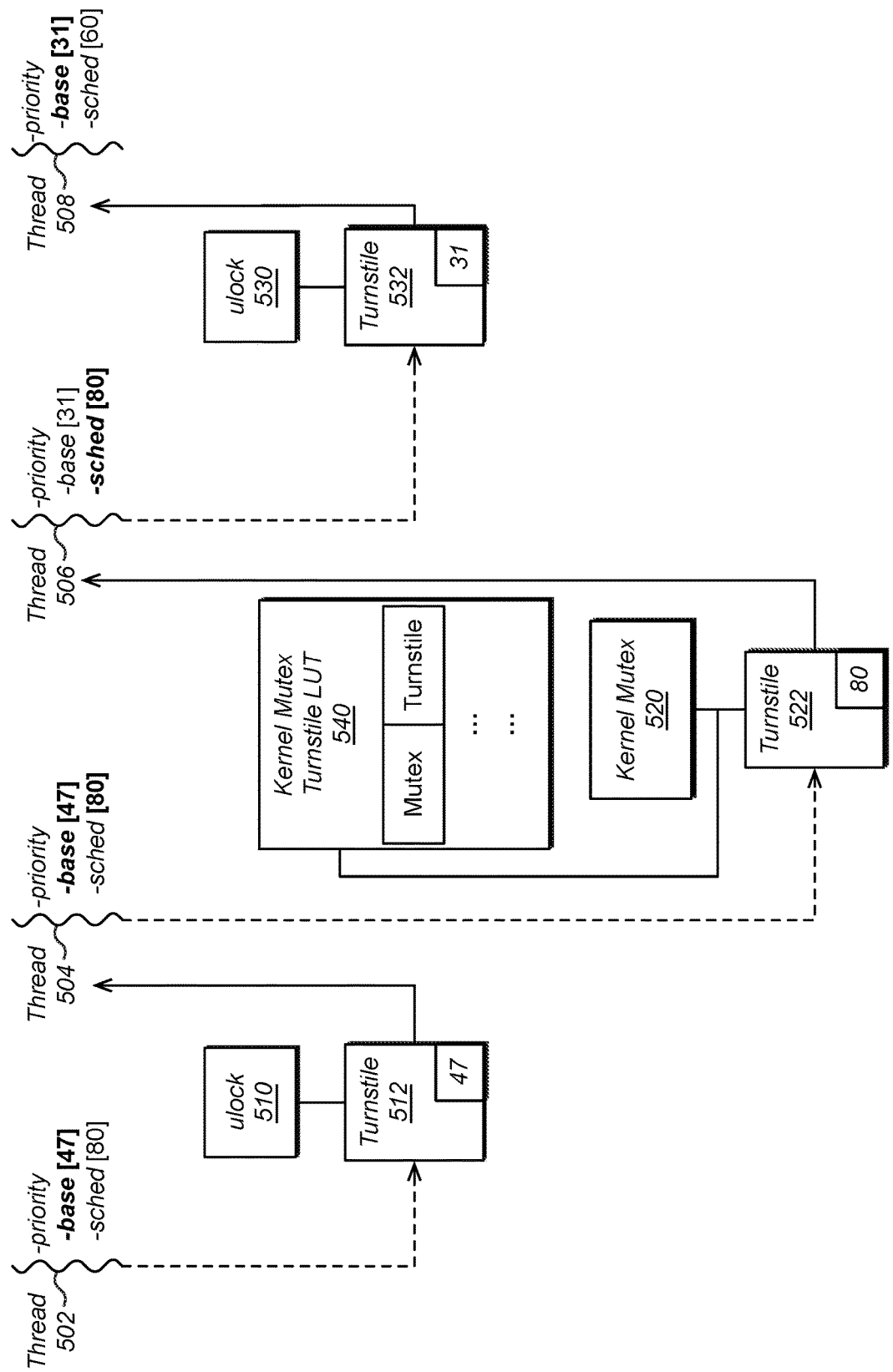
FIG. 5 illustrates turnstile distinctions between kernel mode and user mode synchronization primitives, according to embodiments.

FIG. 5 illustrates turnstile distinctions between kernel mode and user mode synchronization primitives, according to embodiments. In some embodiments, operation of turnstiles 512, 532 associated user mode synchronization primitives (e.g., ulock 510, ulock 530) differs from operation of a turnstiles 522 associated with kernel mode synchronization primitives (e.g., kernel mutex 520).

In one embodiment, ulock 510 and ulock 530 each include a pointer to their respective turnstiles 512, 532. To save space, kernel mutex 520 can omit the pointer to turnstile 522. Instead, a kernel mutex turnstile lookup table 540 can be used in which an address of a primitive is stored in associated with a turnstile of the primitive. In one embodiment, the address of the primitive is hashed.

In one embodiment, a thread can have multiple associated priorities, including a base priority and a scheduler priority, with the scheduler priority generally being a higher priority value. Turnstiles for user mode locks propagate base priorities, while turnstiles for kernel mode locks propagate scheduler priorities. For example, thread 502 has a base (e.g., user mode) priority of [47] and a scheduler (e.g., kernel mode) priority of [80]. When thread 502 is placed on the wait queue of turnstile 512, the base priority [47] is associated with the entry for thread 502 in the wait queue of turnstile 512 because turnstile 512 is associated with ulock 510, which is a user mode primitive. Turnstile 512 can propagate the highest base priority of all waiting threads when boosting thread 504. In one embodiment, when the base priority of a thread is increased, the scheduler priority for the thread is also increased. For example, when thread 504 receives a base priority boost to [47], the scheduler priority will be recalculated and increased accordingly. The scheduler priority boost can be based on the amount of user mode priority boost. For example, the scheduler priority for thread 504 can be boosted based on the difference between the previous and boosted based priority, although the specific relationship between base priority boost and scheduler priority boost can vary across embodiments and implementations.

If thread 504 is blocked waiting to acquire kernel mutex 520, the scheduler priority [80] of thread 504 is stored with the wait queue entry for thread 504 in turnstile 422, as turnstile 522 is associated with kernel mutex 520. If thread 504 is the highest priority waiting thread, the priority of thread 504 can be used to boost thread 506, which holds kernel mutex 520. Even though the scheduler priority of thread 506 is boosted by turnstile 522, the base priority of thread 506 is not changed. Additionally, when thread 506 is placed on the wait queue of turnstile 422, the base priority is associated with the entry because turnstile 532 is associated with ulock 530, which is a user mode primitive. Accordingly, the boosted schedule priority of thread 506 is not propagated through turnstile 532 to thread 508. Additionally, in some embodiments the operating system may require thread 506 to release ownership of kernel mutex 520 before thread 506 may attempt to acquire ulock 530.

In one embodiment, the multiple associated priorities for each thread can be maintained in multiple priority queues. If a thread has ownership of multiple resources, multiple turnstiles may be pushing on the thread. Those turnstiles may be pushing both user mode (e.g., base priorities) and kernel mode (e.g., scheduler priorities), thus each thread can have a user mode priority queue and a kernel mode priority queue, with each queue containing multiple priority pushes from multiple turnstiles. The thread can then operate at the highest relevant priority for a given scenario.

Figure 6A:
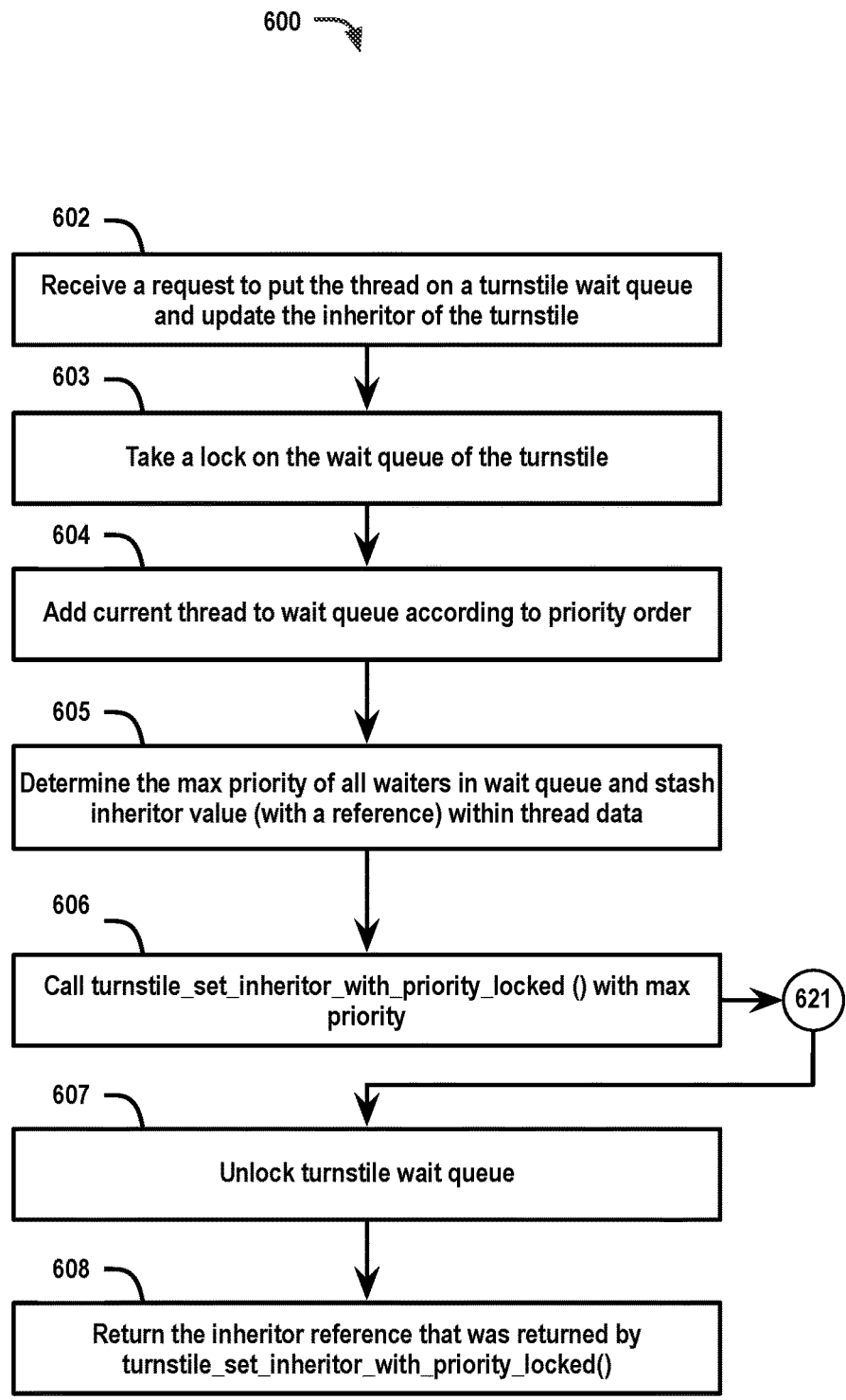
FIG. 6A-6D are a flow diagrams of program logic to implement a turnstile API, according to embodiments described herein.
Figure 6B:
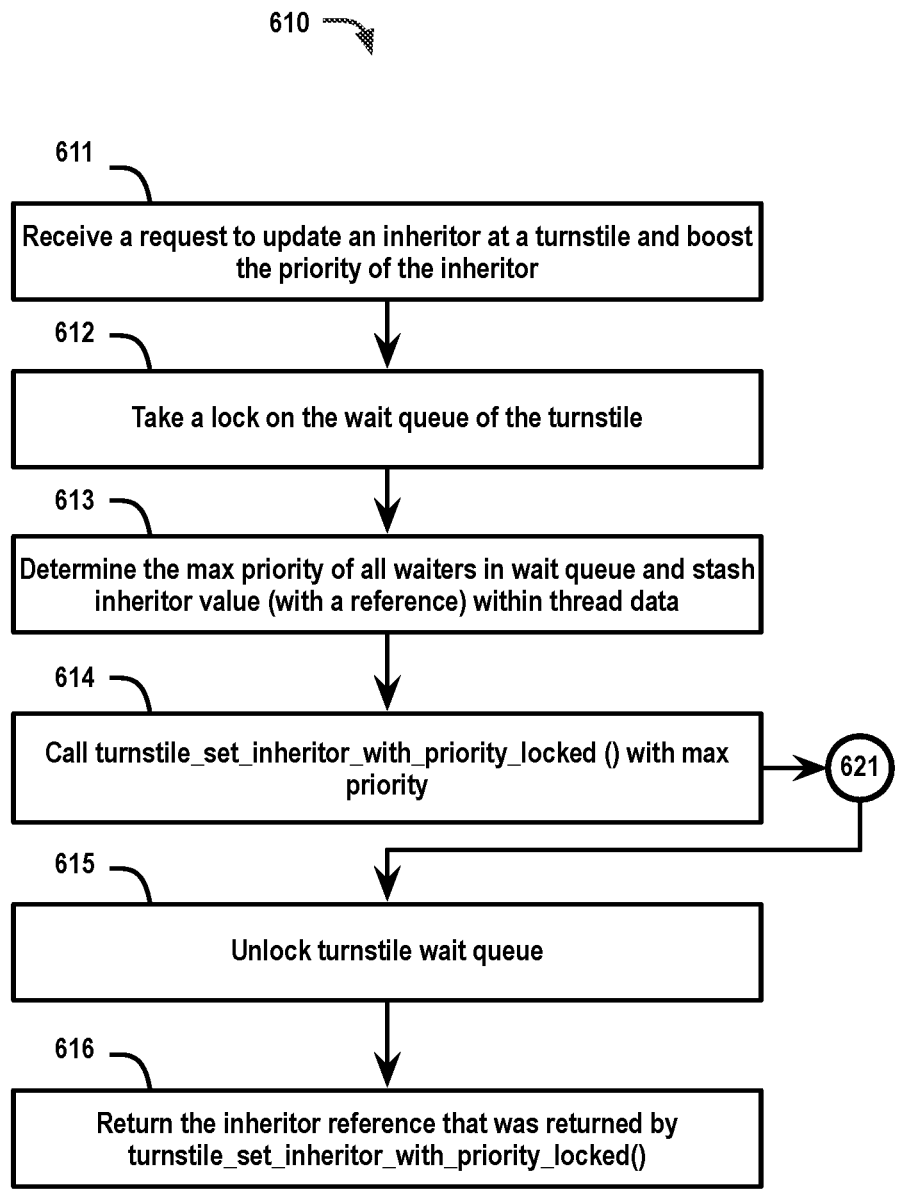
Figure 6C:
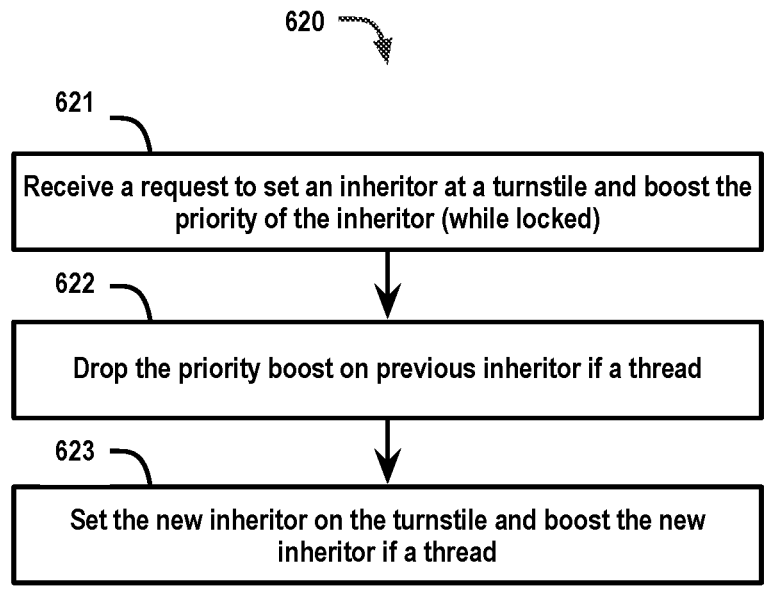
Figure 6D:
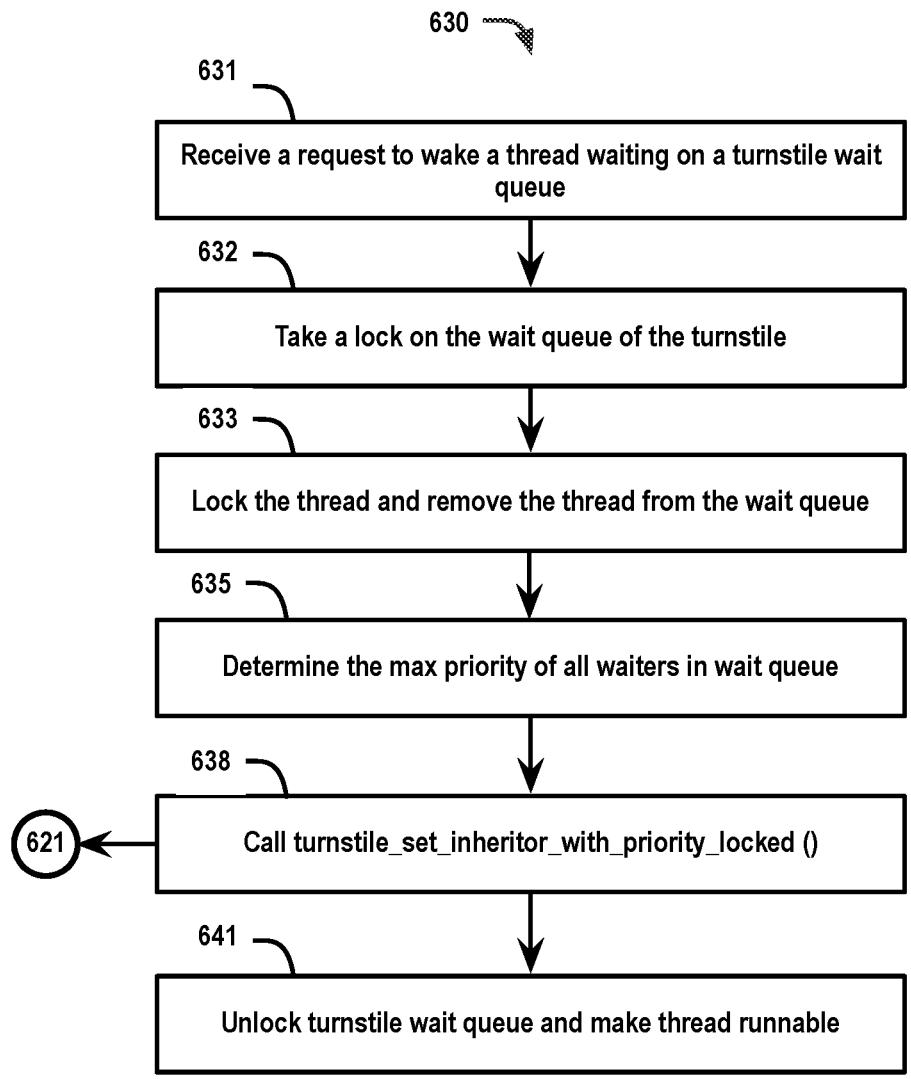

FIG. 6A-6D are a flow diagrams of program logic to implement a turnstile API, according to embodiments described herein. FIG. 6A illustrates logic 600 to put a thread on a wait queue of a turnstile, according to embodiments. FIG. 6B illustrates logic 610 to update an inheritor at a turnstile and boost the priority of the inheritor. FIG. 6C illustrates logic 620 to set an inheritor at a turnstile and boost the priority of the inheritor while the inheritor is locked. FIG. 6D illustrates logic 630 to wake a thread waiting on a turnstile wait queue. The illustrated program logic 600, 610, 620, 630 can be performed by operating system components that implement the turnstile API.

As shown in FIG. 6A, in one embodiment logic 600 can perform operation 602 to receive a request to put the thread on a turnstile wait queue and update the inheritor of the turnstile. Logic 600 can be a function that accepts a turnstile, event, and inheritor and returns a reference to the old inheritor. Operation 603 can take a lock on the wait queue of the turnstile. Operation 604 is performed to add the current thread to wait queue according to priority order. In operation 604, when a thread is added to the turnstile's wait queue, the wait queue is locked, the thread is locked, the thread is added to the wait queue, then the thread is unlocked.

At operation 605, logic 600 can determine the max priority of all waiters in wait queue and stash the inheritor value (with a reference) within thread data. In one embodiment the wait queue is a priority ordered queue and the max priority can be determined by looking at the head of the wait queue.

In operation 606, logic 600 can perform a call to a function turnstile_set_inheritor_with_priority_locked ( ) with max priority at operation 621 of FIG. 6C. Upon return from operation 621, logic 600 can perform operation 607 to unlock the turnstile wait queue. At operation 608 logic 600 can return the inheritor reference that was returned by turnstile_set_inheritor_with_priority_locked( ) of operation 621.

As shown in FIG. 6B, logic 610 can perform operation 611 to receive a request to update an inheritor at a turnstile and boost the priority of the inheritor. Operation 612 can be performed to take a lock on the wait queue of the turnstile. At operation 613, logic 610 can determine the max priority of all waiters in wait queue and the stash inheritor value (with a reference) within thread data. Operation 614 can call turnstile_set_inheritor_with_priority_locked ( ) with max priority. Operation 615 can be performed to unlock the turnstile wait queue. Operation 616 then returns the inheritor reference that was returned by the function call turnstile_set_inheritor_with_priority_locked( ) of operation 621.

As shown in FIG. 6C, logic 620 can perform operation 621 to receive a request to set an inheritor at a turnstile and boost the priority of the inheritor (while locked). The new inheritor is stashed on the current thread. The new inheritor already has an extra reference for the turnstile code to use. Operation 622 can drop the priority boost on previous inheritor the previous inheritor is a thread. If the previous inheritor was a turnstile, the turnstile priority is updated, and a flag is stashed on the current thread to notify the caller that priority propagation is to be performed for the old inheritor. The old inheritor is also stashed in the current thread along with the type of the old inheritor (e.g., thread or turnstile). Logic 620 can then perform operation 623 to set the new inheritor on the turnstile and boost the new inheritor if the new inheritor is a thread.

As shown in FIG. 6D, logic 630 can perform operation 631 to receive a request to wake a thread waiting on a turnstile wait queue. Operation 632 can take a lock on the wait queue of the turnstile. Operation 633 can lock the thread and remove the thread from the wait queue. While removing the thread from the wait queue, the thread and the wait queue are locked. At operation 635, logic 630 can determine the max priority of all waiters in wait queue, which in one embodiment is stored at the head of the priority ordered wait queue. At operation 638, logic 630 can call turnstile_set_inheritor_with_priority_locked ( ) at operation 621. If there are no waiting threads, the new inheritor can be set to NULL. At operation 641, logic 630 can unlock the turnstile wait queue and make thread runnable.

Figure 7A:
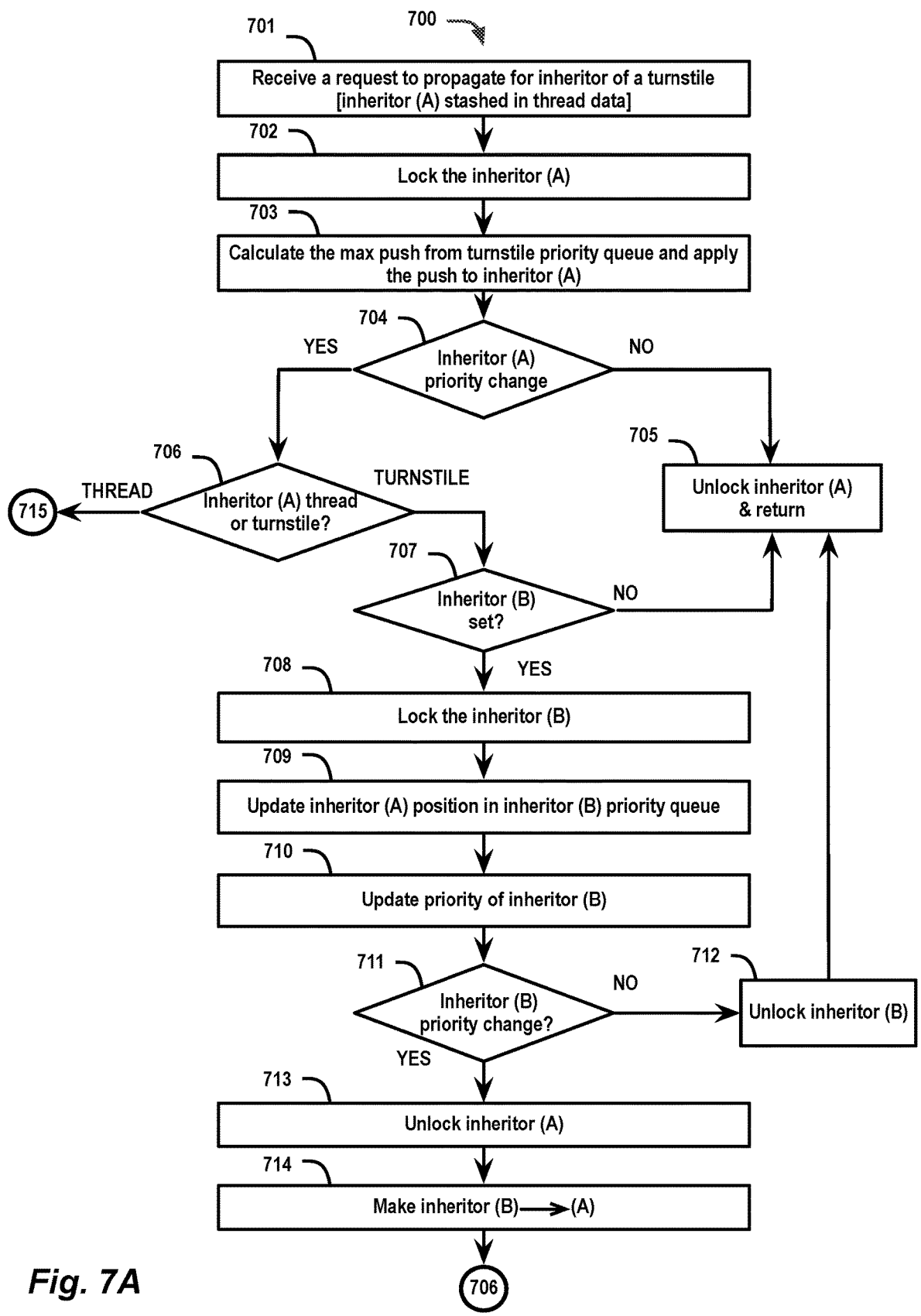
FIG. 7A-7B illustrates logic to perform multi-hop propagation of priority via turnstiles, according to embodiments described herein.
Figure 7B:
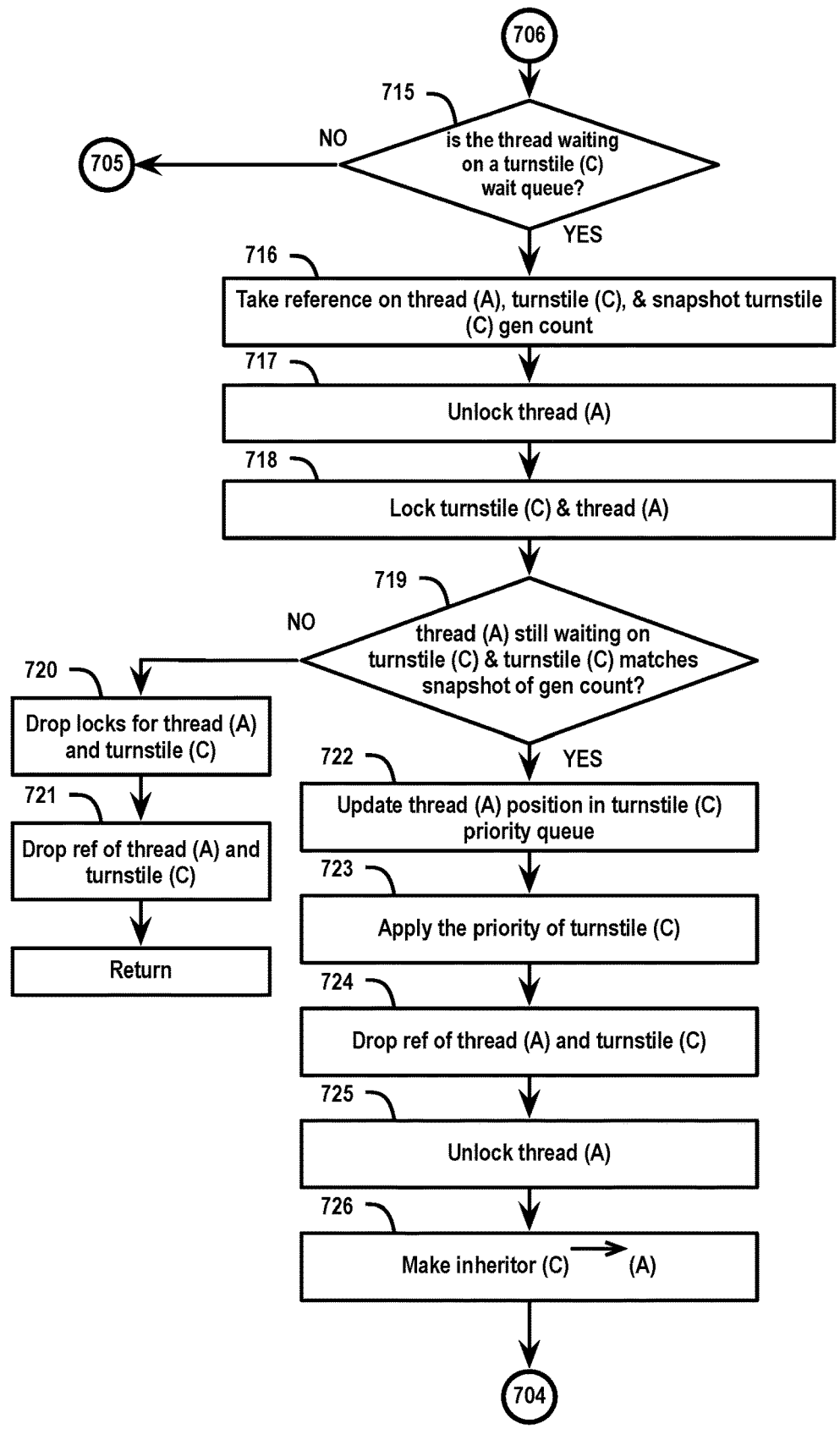

FIG. 7A-7B illustrates logic 700 to perform multi-hop propagation of priority via turnstiles, according to embodiments described herein. Logic 700 can be performed by operating system components that implement the turnstile API.

As shown in FIG. 7A, logic 700 includes instructions to perform operation 701 to receive a request to propagate for inheritor of a turnstile, where data for inheritor (A) is stashed in thread data. Operation 702 can lock the inheritor (A). Operation 703 can calculate the max push from the turnstile priority queue and apply the push to inheritor (A). Operation 704 can determine if, after the push at operation 703, whether the priority for inheritor (A) changed. If operation 704 determines that the priority of inheritor A has not changed, logic 700 can perform operation 705 to unlock inheritor (A) & return.

If inheritor (A) priority changed at operation 704, logic 700 can determine whether inheritor (A) is a thread or turnstile at operation 706. If inheritor A is a thread, logic 700 proceeds to operation 716 in FIG. 7B. If inheritor A is a turnstile, logic 700 can perform operation 707 to determine if inheritor (B) is set. In other words, operation 706 and operation 707 determine whether inheritor (A) is a turnstile that also has an inheritor, which will be inheritor (B). If inheritor (B) is not set, logic 700 can unlock inheritor A and return at operation 705.

If operation 707 determines that inheritor (B) is set, logic 700 can perform operation 708 to lock inheritor (B). Logic 700 then proceeds to operation 709, which updates inheritor (A) position in the inheritor (B) priority queue. Operation 710 then updates the priority of inheritor (B).

Operation 711 can determine if a priority change occurred in inheritor B after operation 710. If the priority of inheritor (B) does not change, logic 700 can perform operation 712 to unlock inheritor B, which then proceeds to operation 705 to unlock inheritor (A) and return. If the priority of inheritor (B) changes after the update at operation 710, logic 700 can perform operation 713 to unlock inheritor (A), followed by operation 714 to make inheritor (B) inheritor (A). After operation 714, logic 700 proceeds to operation 706.

Returning to operation 706, we again note that logic 700 proceeds to operation 715 if inheritor (A) is a turnstile. Operation 715 is shown in FIG. 7B. In operation 715, logic 700 can determine whether the thread (inheritor A) is waiting on the turnstile (C) wait queue. If the thread is not waiting on the turnstile (C) wait queue, logic 700 can proceed to operation 705 to unlock inheritor (A) and return. If operation 715 determines that the thread is waiting on the turnstile (C) wait queue, logic 700 can proceed to operation 716.

At operation 716, logic 700 can take a reference on thread (A) and turnstile (C), then snapshot the turnstile (C) generation count. Operation 717 can then unlock thread (A). Operation 718 can lock turnstile (C) and thread (A). Operation 719 can determine if thread (A) is still waiting on turnstile (C) and turnstile (C) matches the snapshot of the generation count taken in operation 716.

If the determination at operation 719 is negative, logic 700 can proceed to operation 720 to drop the locks for thread (A) and turnstile (C), the drop the reference of thread (A) and turnstile (C) at operation 721 before logic 700 returns. If the determination at operation 722 is positive, logic 700 can proceed to operation 722 to update the position of thread (A) in the turnstile (C) priority queue. Logic 700 can then perform operation 723 to apply the priority of turnstile (C) and drop the reference of thread (A) and turnstile (C) at operation 724. After operation 724, logic 700 can then unlock thread (A) at operation 726. Logic 700 can then perform operation 726 to make inheritor (C) inheritor (A). Logic 700 then proceeds to operation 704.

Figure 8:
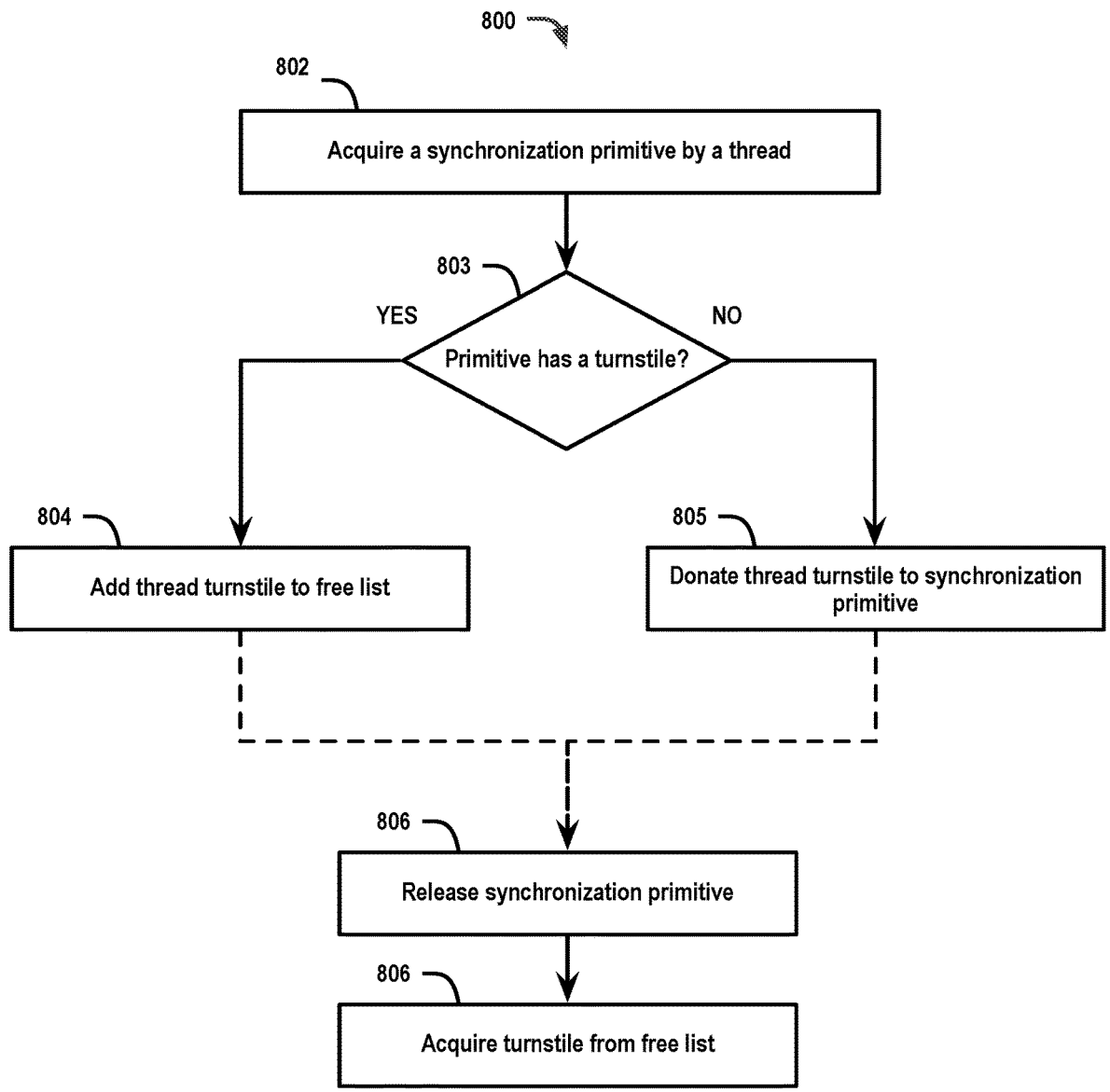
FIG. 8 illustrates logic for a thread to donate and acquire a turnstile, according to an embodiment.

FIG. 8 illustrates logic 800 for a thread to donate and acquire a turnstile, according to an embodiment. Operations of logic 800 can be performed before the turnstile API receives a request to put a thread on a waitlist. In one embodiment, logic 800 can perform operation 802 to acquire a synchronization primitive by a thread. If logic 800 determines at operation 803 that the synchronization primitive has a turnstile, the thread can then add the turnstile of the thread to a free list at operation 804. If the primitive does not have a turnstile, logic 800 can perform operation 805 to donate the turnstile of the thread to the synchronization primitive. When the thread is prepared to release the synchronization primitive at operation 806, logic 800 can perform operation 806 to acquire a turnstile from the free list.

Embodiments described herein include one or more application programming interfaces (APIs) in an environment in which calling program code interacts with other program code that is called through one or more programming interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

An API allows a developer of an API-calling component (which may be a third-party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments, an application or other client program may use an API provided by an Application Framework. In these embodiments, the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low-level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however, the API may be implemented in terms of a specific programming language. An API-calling component can, in one embedment, call APIs from different providers such as a set of APIs from an OS provider and another set of APIs from a plug-in provider and another set of APIs from another provider (e.g., the provider of a software library) or creator of the another set of APIs.

Figure 9:
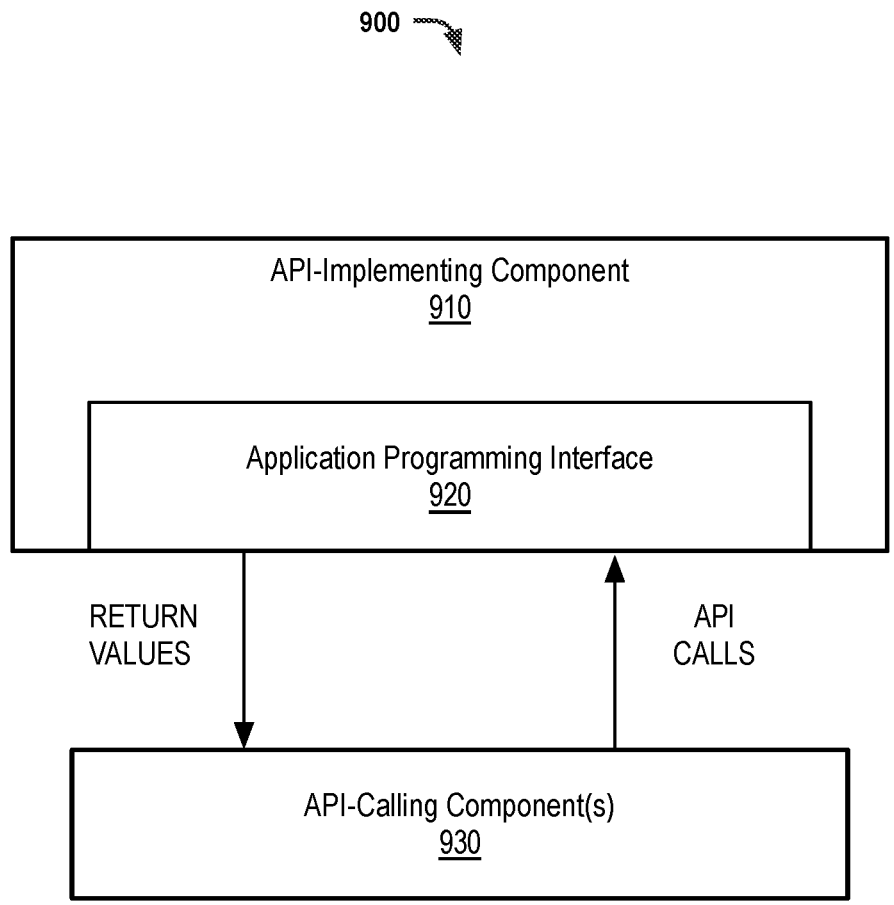
FIG. 9 is a block diagram illustrating an exemplary API architecture, which may be used in some embodiments of the invention.

FIG. 9 is a block diagram illustrating an exemplary API architecture, which may be used in some embodiments of the invention. As shown in FIG. 9, the API architecture 900 includes the API-implementing component 910 (e.g., an operating system, a library, a device driver, an API, an application program, software or other module) that implements the API 920. The API 920 specifies one or more functions, methods, classes, objects, protocols, data structures, formats and/or other features of the API-implementing component that may be used by the API-calling component 930. The API 920 can specify at least one calling convention that specifies how a function in the API-implementing component receives parameters from the API-calling component and how the function returns a result to the API-calling component. The API-calling component 930 (e.g., an operating system, a library, a device driver, an API, an application program, software or other module), makes API calls through the API 920 to access and use the features of the API-implementing component 910 that are specified by the API 920. The API-implementing component 910 may return a value through the API 920 to the API-calling component 930 in response to an API call.

It will be appreciated that the API-implementing component 910 may include additional functions, methods, classes, data structures, and/or other features that are not specified through the API 920 and are not available to the API-calling component 930. It should be understood that the API-calling component 930 may be on the same system as the API-implementing component 910 or may be located remotely and accesses the API-implementing component 910 using the API 920 over a network. While FIG. 9 illustrates a single API-calling component 930 interacting with the API 920, it should be understood that other API-calling components, which may be written in different languages (or the same language) than the API-calling component 930, may use the API 920.

The API-implementing component 910, the API 920, and the API-calling component 930 may be stored in a machine-readable medium, which includes any mechanism for storing information in a form readable by a machine (e.g., a computer or other data processing system). For example, a machine-readable medium includes magnetic disks, optical disks, random-access memory; read only memory, flash memory devices, etc.

Figure 10A:
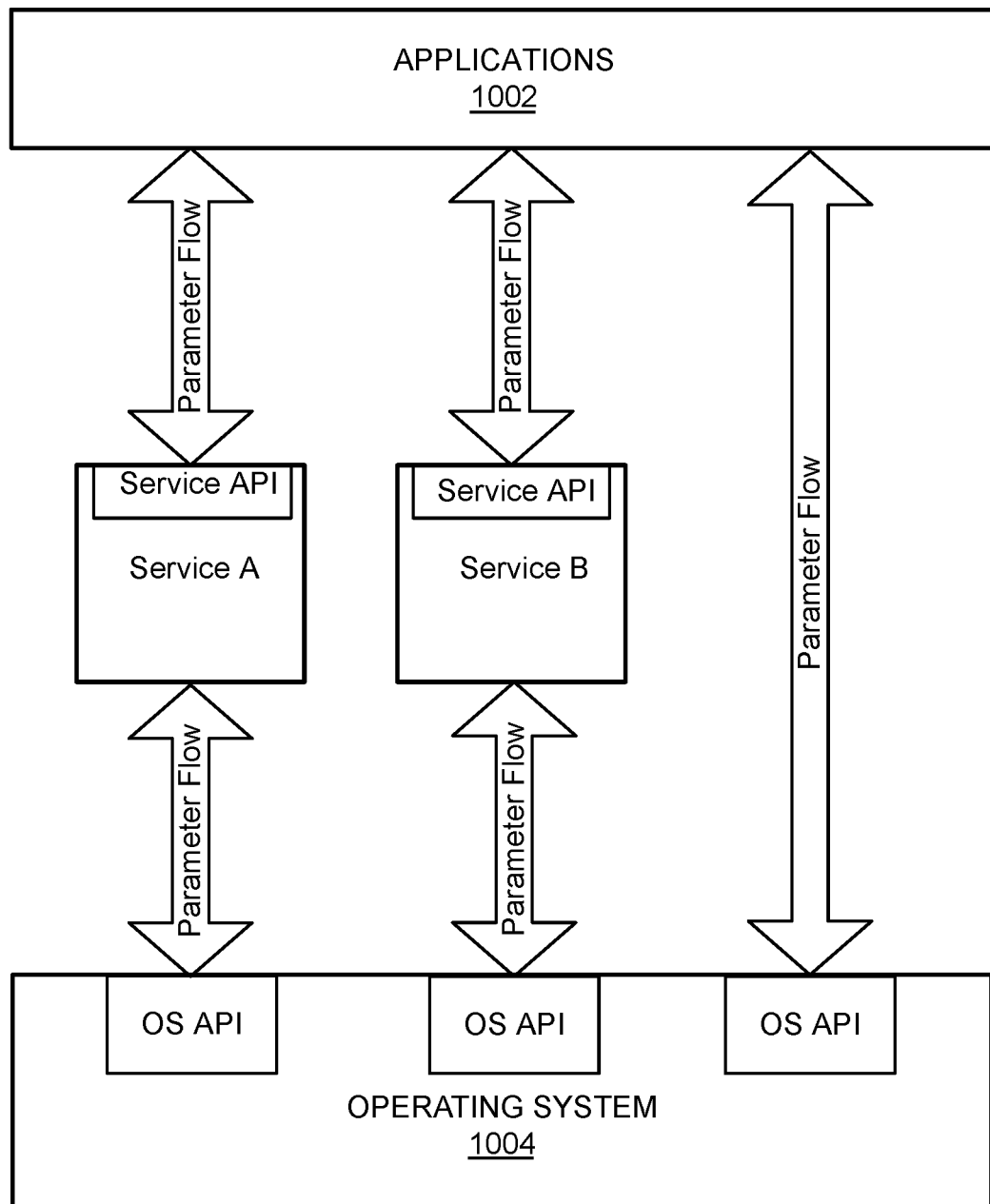
FIG. 10A-10B are block diagrams of exemplary API software stacks according to embodiments.
Figure 10B:
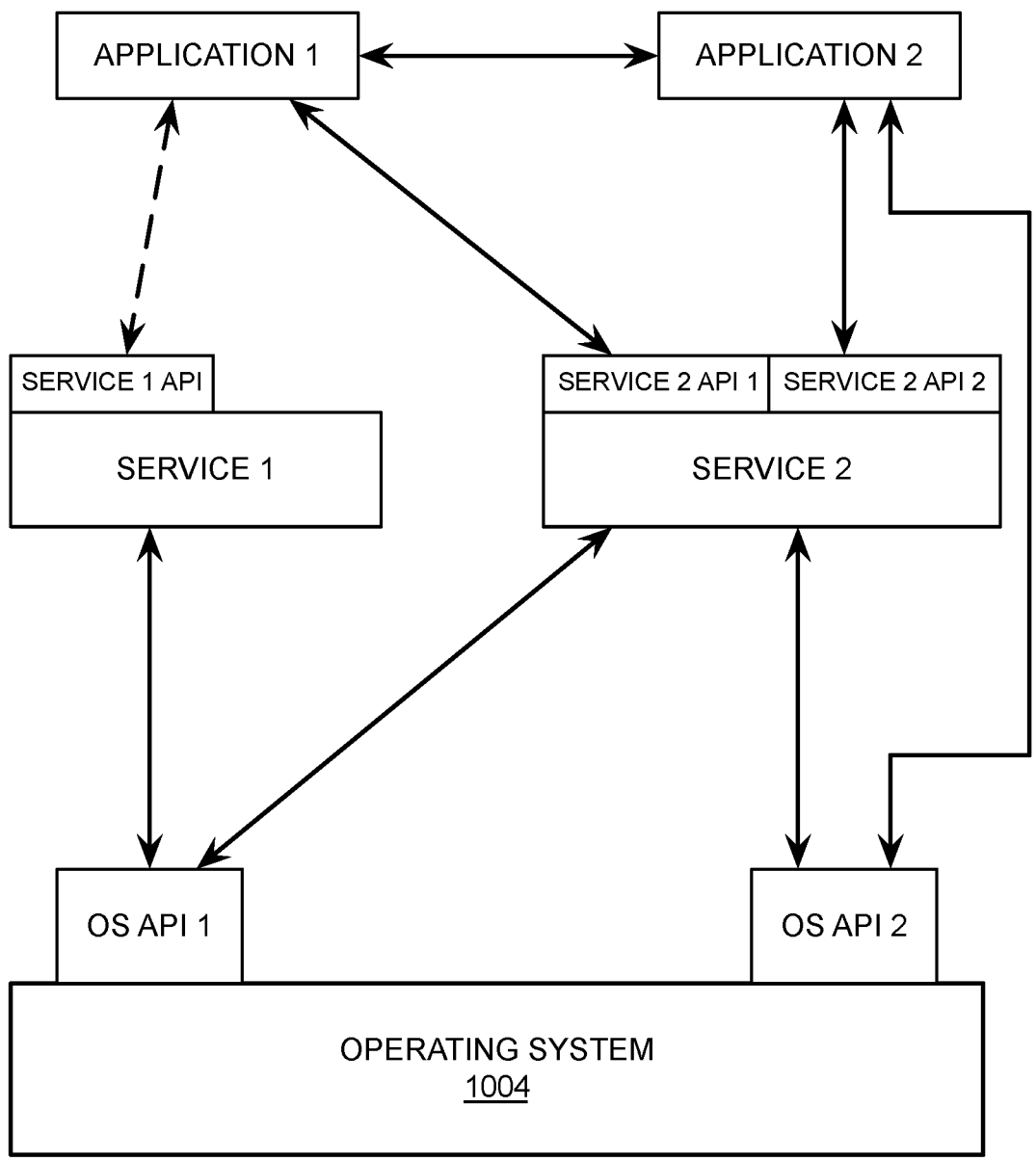

FIG. 10A-10B are block diagrams of exemplary API software stacks 1000, 1010, according to embodiments. FIG. 10A shows an exemplary API software stack 1000 in which applications 1002 can make calls to Service A or Service B using Service API and to Operating System 1004 using an OS API. Additionally, Service A and Service B can make calls to Operating System 1004 using several OS APIs.

FIG. 10B shows an exemplary software stack 1010 including Application 1, Application 2, Service 1, Service 2, and Operating System 1004. As illustrated, Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Figure 11:
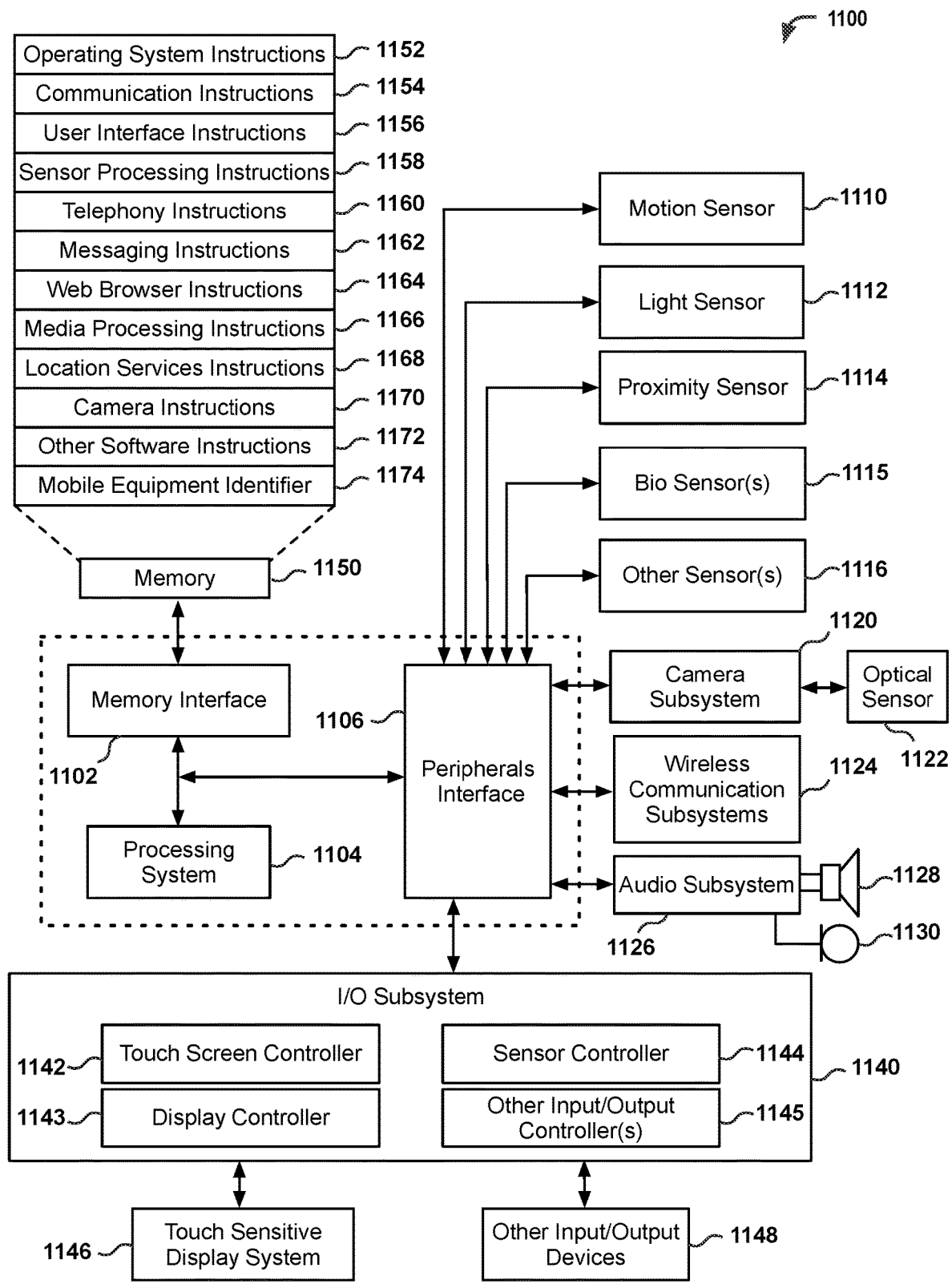
FIG. 11 is a block diagram of a device architecture for a mobile or embedded device, according to an embodiment.

FIG. 11 is a block diagram of a device architecture 1100 for a mobile or embedded device, according to an embodiment. The device architecture 1100 includes a memory interface 1102, a processing system 1104 including one or more data processors, image processors and/or graphics processing units, and a peripherals interface 1106. The various components can be coupled by one or more communication buses or signal lines. The various components can be separate logical components or devices or can be integrated in one or more integrated circuits, such as in a system on a chip integrated circuit.

The memory interface 1102 can be coupled to memory 1150, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 1106 to facilitate multiple functionalities. For example, a motion sensor 1110, a light sensor 1112, and a proximity sensor 1114 can be coupled to the peripherals interface 1106 to facilitate the mobile device functionality. One or more biometric sensor(s) 1115 may also be present, such as a fingerprint scanner for fingerprint recognition or an image sensor for facial recognition. Other sensors 1116 can also be connected to the peripherals interface 1106, such as a positioning system (e.g., GPS receiver), a temperature sensor, or other sensing device, to facilitate related functionalities. A camera subsystem 1120 and an optical sensor 1122, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1124, which can include radio frequency receivers and transmitters and/or optical (e.g., infrared) receivers and transmitters. The specific design and implementation of the wireless communication subsystems 1124 can depend on the communication network(s) over which a mobile device is intended to operate. For example, a mobile device including the illustrated device architecture 1100 can include wireless communication subsystems 1124 designed to operate over a GSM network, a CDMA network, an LTE network, a Wi-Fi network, a Bluetooth network, or any other wireless network. In particular, the wireless communication subsystems 1124 can provide a communications mechanism over which a media playback application can retrieve resources from a remote media server or scheduled events from a remote calendar or event server.

An audio subsystem 1126 can be coupled to a speaker 1128 and a microphone 1130 to facilitate voice-enabled functions, such as voice recognition, voice replication, digital recording, and telephony functions. In smart media devices described herein, the audio subsystem 1126 can be a high-quality audio system including support for virtual surround sound.

The I/O subsystem 1140 can include a touch screen controller 1142 and/or other input controller(s) 1145. For computing devices including a display device, the touch screen controller 1142 can be coupled to a touch sensitive display system 1146 (e.g., touch-screen). The touch sensitive display system 1146 and touch screen controller 1142 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1146. Display output for the touch sensitive display system 1146 can be generated by a display controller 1143. In one embodiment, the display controller 1143 can provide frame data to the touch sensitive display system 1146 at a variable frame rate.

In one embodiment, a sensor controller 1144 is included to monitor, control, and/or processes data received from one or more of the motion sensor 1110, light sensor 1112, proximity sensor 1114, or other sensors 1116. The sensor controller 1144 can include logic to interpret sensor data to determine the occurrence of one of more motion events or activities by analysis of the sensor data from the sensors.

In one embodiment, the I/O subsystem 1140 includes other input controller(s) 1145 that can be coupled to other input/control devices 1148, such as one or more buttons, rocker switches, thumb-wheel, infrared port, USB port, and/or a pointer device such as a stylus, or control devices such as an up/down button for volume control of the speaker 1128 and/or the microphone 1130.

In one embodiment, the memory 1150 coupled to the memory interface 1102 can store instructions for an operating system 1152, including portable operating system interface (POSIX) compliant and non-compliant operating system or an embedded operating system. The operating system 1152 may include instructions for handling basic system services and for performing hardware dependent tasks. In some implementations, the operating system 1152 can be a kernel.

The memory 1150 can also store communication instructions 1154 to facilitate communicating with one or more additional devices, one or more computers and/or one or more servers, for example, to retrieve web resources from remote web servers. The memory 1150 can also include user interface instructions 1156, including graphical user interface instructions to facilitate graphic user interface processing.

Additionally, the memory 1150 can store sensor processing instructions 1158 to facilitate sensor-related processing and functions; telephony instructions 1160 to facilitate telephone-related processes and functions; messaging instructions 1162 to facilitate electronic-messaging related processes and functions; web browser instructions 1164 to facilitate web browsing-related processes and functions; media processing instructions 1166 to facilitate media processing-related processes and functions; location services instructions including GPS and/or navigation instructions 1168 and Wi-Fi based location instructions to facilitate location based functionality; camera instructions 1170 to facilitate camera-related processes and functions; and/or other software instructions 1172 to facilitate other processes and functions, e.g., security processes and functions, and processes and functions related to the systems. The memory 1150 may also store other software instructions such as web video instructions to facilitate web video-related processes and functions; and/or web shopping instructions to facilitate web shopping-related processes and functions. In some implementations, the media processing instructions 1166 are divided into audio processing instructions and video processing instructions to facilitate audio processing-related processes and functions and video processing-related processes and functions, respectively. A mobile equipment identifier, such as an International Mobile Equipment Identity (IMEI) 1174 or a similar hardware identifier can also be stored in memory 1150.

Each of the above identified instructions and applications can correspond to a set of instructions for performing one or more functions described above. These instructions need not be implemented as separate software programs, procedures, or modules. The memory 1150 can include additional instructions or fewer instructions. Furthermore, various functions may be implemented in hardware and/or in software, including in one or more signal processing and/or application specific integrated circuits.

Figure 12:
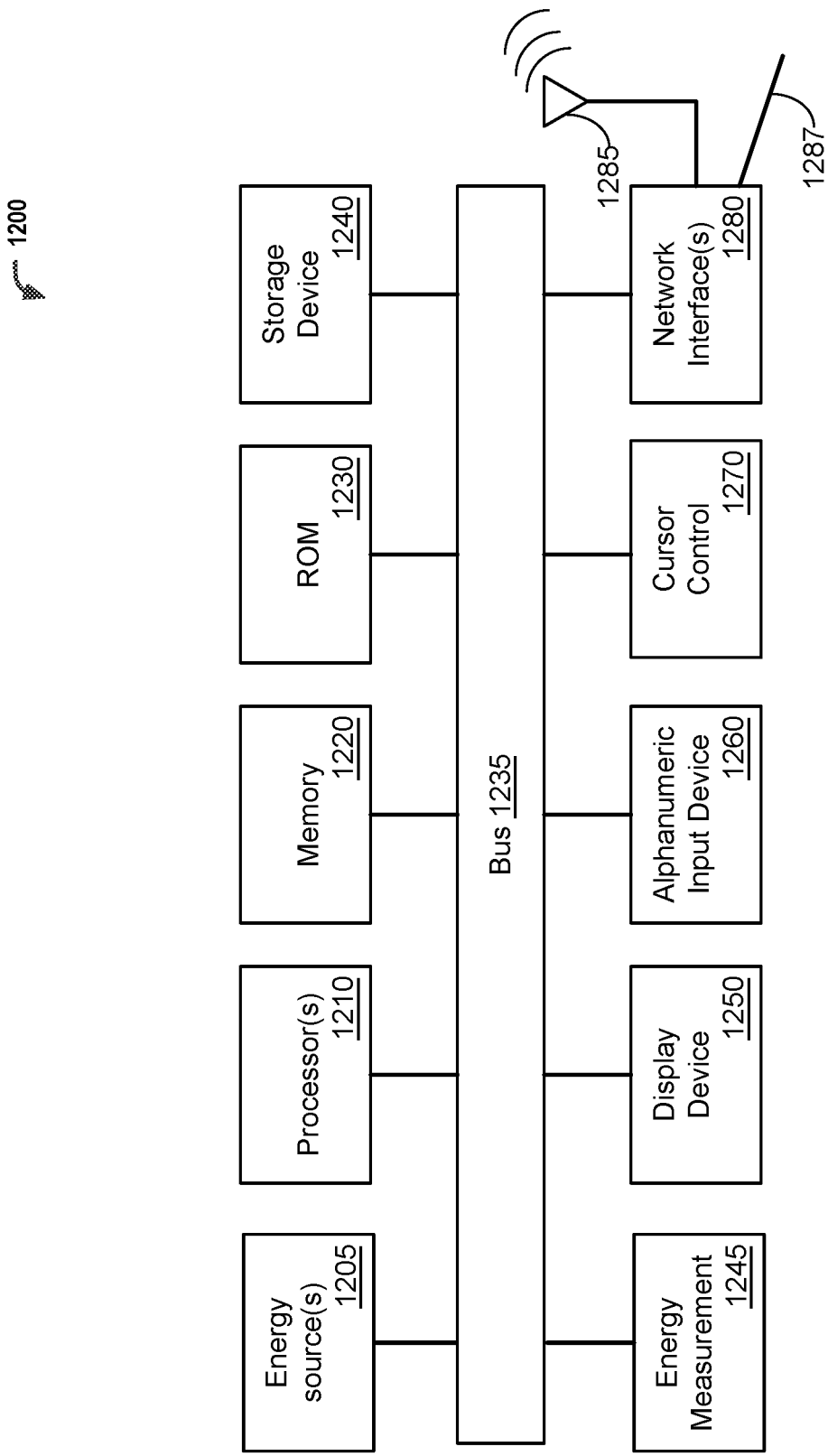
FIG. 12 is a block diagram of a computing system, according to an embodiment.

FIG. 12 is a block diagram of a computing system 1200, according to an embodiment. The illustrated computing system 1200 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 1200 can be used to provide the computing device and/or a server device to which the computing device may connect.

The computing system 1200 includes bus 1235 or other communication device to communicate information, and processor(s) 1210 coupled to bus 1235 that may process information. While the computing system 1200 is illustrated with a single processor, the computing system 1200 may include multiple processors and/or co-processors. The computing system 1200 further may include random access memory 1220 (RAM) or other dynamic storage device coupled to the bus 1235. The memory 1220 may store information and instructions that may be executed by processor(s) 1210. Main memory 1220 may also be used to store temporary variables or other intermediate information during execution of instructions by the processor(s) 1210.

The computing system 1200 may also include read only memory (ROM) 1230 and/or another data storage device 1240 coupled to the bus 1235 that may store information and instructions for the processor(s) 1210. The data storage device 1240 can be or include a variety of storage devices, such as a flash memory device, a magnetic disk, or an optical disc and may be coupled to computing system 1200 via the bus 1235 or via a remote peripheral interface.

The computing system 1200 may also be coupled, via the bus 1235, to a display device 1250 to display information to a user. The computing system 1200 can also include an alphanumeric input device 1260, including alphanumeric and other keys, which may be coupled to bus 1235 to communicate information and command selections to processor(s) 1210. Another type of user input device includes a cursor control 1270 device, such as a touchpad, a mouse, a trackball, or cursor direction keys to communicate direction information and command selections to processor(s) 1210 and to control cursor movement on the display device 1250. The computing system 1200 may also receive user input from a remote device that is communicatively coupled via one or more network interface(s) 1280.

The computing system 1200 further may include one or more network interface(s) 1280 to provide access to a network, such as a local area network. The network interface(s) 1280 may include, for example, a wireless network interface having antenna 1285, which may represent one or more antenna(e). The computing system 1200 can include multiple wireless network interfaces such as a combination of Wi-Fi, Bluetooth®, near field communication (NFC), and/or cellular telephony interfaces. The network interface(s) 1280 may also include, for example, a wired network interface to communicate with remote devices via network cable 1287, which may be, for example, an Ethernet cable, a coaxial cable, a fiber optic cable, a serial cable, or a parallel cable.

In one embodiment, the network interface(s) 1280 may provide access to a local area network, for example, by conforming to IEEE 802.11 standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1280 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 1200 can further include one or more energy sources 1205 and one or more energy measurement systems 1245. Energy sources 1205 can include an AC/DC adapter coupled to an external power source, one or more batteries, one or more charge storage devices, a USB charger, or other energy source. Energy measurement systems include at least one voltage or amperage measuring device that can measure energy consumed by the computing system 1200 during a predetermined period of time. Additionally, one or more energy measurement systems can be included that measure, e.g., energy consumed by a display device, cooling subsystem, Wi-Fi subsystem, or other frequently used or high-energy consumption subsystem.

In the foregoing description, example embodiments of the disclosure have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described herein.

Embodiments described herein provide a common framework that can be adopted across multiple different types of synchronization primitives to provide a common service for priority boosting and wait queuing. In one embodiment, a "turnstile" OS primitive is provided that enables support for owner tracking and waiting. A turnstile can enable one-hop priority boosting for the owner of the turnstile.

One embodiment provides for a data processing system comprising a memory device to store instructions and one or more processors coupled to the memory device. The one or more processors are configured to execute the instructions stored on the memory device. The instructions, when executed, cause the one or more processors to execute a first thread at a first priority, wherein the first thread has ownership of a first synchronization primitive of a first type and is in a wait state to acquire a second synchronization primitive of a second type that is different from the first type, the second synchronization primitive owned by a second thread having a second priority, execute a third thread at a third priority, wherein the third thread is to attempt to acquire the first synchronization primitive and the third priority is higher than the first priority and the second priority, and in response to determination that the first synchronization primitive is owned by first thread, boost the first thread to the third priority and propagate the boost to the second thread.

One embodiment provides for a data processing system comprising a memory device to store instructions and one or more processors coupled to the memory device. The one or more processors are to execute the instructions stored on the memory device. The instructions, when executed, cause the one or more processors to execute a first thread. The first thread has ownership of a first synchronization primitive and is in a wait state to acquire a second synchronization primitive. The first synchronization primitive is a user mode primitive, the second synchronization primitive is a kernel mode primitive, and the second synchronization primitive is owned by a second thread. The instructions additionally cause the one or more processors to boost the priority of the second thread while the first thread is in the wait state to acquire the second synchronization primitive in response to a determination that the first thread has a higher priority than the second thread. The first thread has a user mode priority and a kernel mode priority. To boost the priority of the second thread includes to apply the kernel mode priority to the second thread.

One embodiment provides for a non-transitory machine-readable medium storing instructions which, when executed, cause one or more processors to perform operations comprising executing a first thread at a first priority, wherein the first thread has ownership of a first synchronization primitive of a first type and is in a wait state to acquire a second synchronization primitive of a second type that is different from the first type, the second synchronization primitive owned by a second thread having a second priority, executing a third thread at a third priority, wherein the third thread is to attempt to acquire the first synchronization primitive and the third priority is higher than the first priority and the second priority, and boosting the first thread to the third priority and propagate the boost to the second thread in response to determination that the first synchronization primitive is owned by first thread.

One embodiment provides for a computer-implemented method implemented via one or more processors, the method comprising executing a first thread at a first priority via the one or more processors, wherein the first thread has ownership of a first synchronization primitive of a first type and is in a wait state to acquire a second synchronization primitive of a second type that is different from the first type, the second synchronization primitive owned by a second thread having a second priority, executing a third thread at a third priority via the one or more processors, wherein the third thread is to attempt to acquire the first synchronization primitive and the third priority is higher than the first priority and the second priority, and boosting the first thread to the third priority and propagate the boost to the second thread in response to determination that the first synchronization primitive is owned by first thread.

Other features of the present embodiments will be apparent from the accompanying drawings and from the detailed description above. Accordingly, the true scope of the embodiments will become apparent to the skilled practitioner upon a study of the drawings, specification, and following claims.

What is claimed is:

1. A data processing system comprising:
   a memory device to store instructions;
   one or more processors coupled to the memory device, wherein the one or more processors are to execute the instructions stored on the memory device and the instructions, when executed, cause the one or more processors to:
      execute a first thread, wherein the first thread has ownership of a first synchronization primitive and is in a wait state to acquire a second synchronization primitive, wherein the first synchronization primitive is a user mode primitive, the second synchronization primitive is a kernel mode primitive, and the second synchronization primitive is owned by a second thread; and
      boost a priority of the second thread while the first thread is in the wait state to acquire the second synchronization primitive in response to a determination that the first thread has a higher priority than the second thread, wherein the first thread has a user mode priority and a kernel mode priority and to boost the priority of the second thread includes to apply the kernel mode priority to the second thread.

2. The data processing system as in claim 1, wherein the first thread is to execute at the user mode priority while having ownership of the first synchronization primitive and the second thread is to execute at the kernel mode priority while having ownership of the second synchronization primitive.

3. The data processing system as in claim 2, wherein the one or more processors are further to:
   associate the first synchronization primitive with a first turnstile object, wherein the first turnstile object is to indicate an owner of the first synchronization primitive and maintain a priority queue of threads dependent upon ownership of the first synchronization primitive; and
   associate the second synchronization primitive with a second turnstile object, wherein the second turnstile object is to indicate an owner of the second synchronization primitive and maintain a priority queue of threads dependent upon ownership of the second synchronization primitive.

4. The data processing system as in claim 3, wherein to boost the priority of the second thread, the one or more processors are further to:
   add an entry for the first thread to the priority queue of the second turnstile object, the entry for the first thread including the kernel mode priority of the first thread; and
   apply a highest priority in the priority queue of the second turnstile object to the second thread.

5. The data processing system as in claim 4, wherein the second thread includes a user mode priority queue and a kernel mode priority queue, each priority queue to store a set of priorities received from a set of turnstile objects.

6. The data processing system as in claim 5, wherein the one or more processors are further to:
   add the kernel mode priority from the second turnstile object to the kernel mode priority queue of the second thread; and
   execute the second thread at the highest priority in the kernel mode priority queue of the second thread while the second thread has ownership of the second synchronization primitive.

7. The data processing system as in claim 6, wherein the one or more processors are further to:
   attempt to acquire the first synchronization primitive via a third thread, wherein the third thread includes a user mode priority queue and a kernel mode priority queue, each priority queue to store a set of priorities received from a set of turnstile objects; and
   add an entry for the third thread to the priority queue of the first turnstile object, the entry for the third thread to indicate that the third thread is blocked while waiting on the first synchronization primitive.

8. The data processing system as in claim 7, wherein the one or more processors are further to:
   add the highest priority entry in the user mode priority queue of the third thread to the entry for the third thread in the priority queue of the first turnstile object in response to a determination that the first synchronization primitive is a user mode primitive; and
   add the highest priority in the priority queue of the first turnstile object to the user mode priority queue of the first thread, wherein the user mode priority of the first thread is the highest priority in the user mode priority queue of the first thread.

9. The data processing system as in claim 8, wherein the one or more processors are further to:
increase the kernel mode priority of the first thread in response to an increase in the user mode priority of the first thread; and
update the entry for the first thread in the priority queue of the second turnstile object in response to the increase in the kernel mode priority of the first thread.

10. The data processing system as in claim 9, wherein the one or more processors are further to propagate the increase in the kernel mode priority of the first thread to the second thread via the entry for the first thread in the second turnstile object.

11. The data processing system as in claim 10, wherein to propagate the increase in the kernel mode priority of the first thread to the second thread the one or more processors are to:
update the priority from the second turnstile object in the kernel mode priority queue of the second thread; and
execute the second thread at the highest priority in the kernel mode priority queue of the second thread while the second thread has ownership of the second synchronization primitive.

12. A non-transitory machine-readable medium storing instructions which, when executed, cause one or more processors to perform operations comprising:
instantiating a synchronization primitive to control access to a resource;
acquiring the synchronization primitive at a first thread, the first thread having a first priority;
associating a first turnstile object with the synchronization primitive in response to acquiring the synchronization primitive at a first thread, the first turnstile object to track ownership and a set of threads that are blocked while waiting for the synchronization primitive;
attempting to acquire the synchronization primitive at a second thread while the synchronization primitive is held by the first thread, the second thread having a second priority; and
adding the second thread to a wait queue of the first turnstile and signaling the second thread when the synchronization primitive is available to be acquired.

13. The non-transitory machine-readable medium as in claim 12, the operations additionally comprising:
setting an inheritor of the first turnstile object to the first thread, the inheritor to indicate an owner of the synchronization primitive; and
increasing the priority of the first thread to the second priority because the first thread is set as the inheritor of the first turnstile object, wherein before increasing the priority of the first thread to the second priority, determining that the second priority is a highest priority associated with threads in the wait queue of the first turnstile object.

14. The non-transitory machine-readable medium as in claim 13, wherein the first thread is blocked while waiting on a synchronous dispatch, the synchronous dispatch is associated with a second turnstile object, and the first thread is on a wait queue of the second turnstile object, wherein the synchronous dispatch is to synchronize execution of a code block provided by the first thread.

15. The non-transitory machine-readable medium as in claim 14, wherein the inheritor of the second turnstile is a third turnstile object associated with a queue manager, the queue manager associated with a thread request, the thread request to provide a worker thread from a thread pool, the worker thread to execute an asynchronous dispatch that is queued ahead of the synchronous dispatch.

16. The non-transitory machine-readable medium as in claim 15, wherein the thread request is associated with the third turnstile object, and wherein in response to determining that the thread request is associated with a third priority that is lower than the first priority, associating the priority of the thread request with the first priority using the third turnstile object.

17. The non-transitory machine-readable medium as in claim 16, wherein associating the priority of the thread request with the first priority includes setting the thread request to the first priority while the thread request is in a first state and setting a creator thread of the thread request to the first priority while the thread request is in a second state, wherein the creator thread of the thread request is to provide the worker thread from the thread pool to execute the asynchronous dispatch that is queued ahead of the synchronous dispatch.

18. The non-transitory machine-readable medium as in claim 17, wherein setting the creator thread of the thread request to the first priority includes setting the inheritor of the second turnstile object to the creator thread and setting the creator thread to the first priority when the first priority is associated with a highest priority thread in a wait queue of the second turnstile object.

19. An electronic device comprising:
a memory device to store instructions;
one or more processors coupled to the memory device, wherein the one or more processors are to execute the instructions stored on the memory device and the instructions, when executed, cause the one or more processors to:
block execution of a first thread, the first thread blocked while waiting to send a message via a first interprocess communication (IPC) port;
associate a first turnstile object with the first IPC port, the first turnstile object including a first inheritor and a first wait queue, wherein the first inheritor indicates a target of a priority boost for the first turnstile object and the first wait queue includes a first set of threads that are blocked while waiting on the first IPC port;
add an entry for the first thread to the first wait queue, wherein the entry includes a first priority, the first priority associated with the first thread;
determine a highest priority thread in the first wait queue; and
apply the priority boost for the first turnstile object to the first inheritor, the priority boost based on the priority of the highest priority thread in the first wait queue.

20. The electronic device as in claim 19, wherein to boost the priority of the inheritor of the first turnstile object, the one or more processors are to:
set a priority of the highest priority thread in the first wait queue as a boost priority; and
set the priority of the first inheritor to the boost priority when the boost priority is higher than the priority of the first inheritor.

21. The electronic device as in claim 20, the one or more processors additionally to:
block a second thread on a second IPC port, the second thread blocked while waiting to receive a message via a second IPC port;
associate a second turnstile object with the second IPC port, the second turnstile object including an inheritor and a second wait queue, wherein the inheritor indicates a target of a priority boost for the second turnstile object and the second wait queue includes a second set of threads that are blocked while waiting on the second IPC port;

add an entry for the second thread to the second wait queue, wherein the entry includes a second priority, the second priority associated with the second thread;

determine a highest priority thread in the second wait queue; and apply the priority boost for the second turnstile object to a second inheritor, the priority boost based on the priority of the highest priority thread in the second wait queue.

22. The electronic device as in claim 21, the one or more processors additionally to:

determine that a message to be sent via the first IPC port is enqueued on the first IPC port; and set the second inheritor to the first turnstile object.

23. The electronic device as in claim 22, wherein one or more operations of the first IPC port are blocked waiting on a queue manager, the queue manager is associated with a third turnstile object, the third turnstile object includes a priority queue, the priority queue including an entry for the first turnstile object, and the entry for the first turnstile object indicates the priority boost associated with the first turnstile object.

24. The electronic device as in claim 23, wherein an inheritor of the third turnstile object is a servicer thread associated with the queue manager, the servicer thread is to perform an operation to enable the message to be sent via the first IPC port and unblock the first thread.

25. The electronic device as in claim 23, the one or more processors additionally to:

determine that the message has been sent via the first IPC port;

set the second inheritor to the third turnstile object; and apply the priority boost for the second turnstile object to the second inheritor, wherein the priority boost for the second turnstile object is to be propagated to a servicer thread associated with the queue manager, the servicer thread to perform an operation to enable the message to be received via the second IPC port and unblock the second thread.

* * * * *